United States Patent
Kishimoto et al.

(10) Patent No.: US 12,001,245 B2
(45) Date of Patent: Jun. 4, 2024

(54) ELECTRONIC PRODUCTS

(71) Applicant: SAMSUNG DISPLAY CO., LTD., Yongin-si (KR)

(72) Inventors: Hirotsugu Kishimoto, Hwaseong-si (KR); Da Som Gu, Asan-si (KR); Sung Guk An, Suwon-si (KR); Jeong Il Yoo, Seoul (KR); Jang Doo Lee, Hwaseong-si (KR); Yong Chan Jeon, Cheonan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 106 days.

(21) Appl. No.: 17/645,303

(22) Filed: Dec. 20, 2021

(65) Prior Publication Data

US 2022/0291716 A1    Sep. 15, 2022

(30) Foreign Application Priority Data

Mar. 15, 2021    (KR) .................. 10-2021-0033153

(51) Int. Cl.
*G06F 1/16* (2006.01)
(52) U.S. Cl.
CPC .......... *G06F 1/1643* (2013.01); *G06F 1/1616* (2013.01)

(58) Field of Classification Search
None
See application file for complete search history.

(56) References Cited

U.S. PATENT DOCUMENTS

| | | | |
|---|---|---|---|
| 2019/0207141 A1* | 7/2019 | Kim | ............. H10K 77/111 |
| 2022/0229470 A1 | 7/2022 | Kishimoto | |

FOREIGN PATENT DOCUMENTS

| | | |
|---|---|---|
| KR | 20190101684 | 9/2019 |
| KR | 10-2022-010 | 7/2022 |

* cited by examiner

*Primary Examiner* — Anthony Q Edwards
*Assistant Examiner* — Rashen E Morrison
(74) *Attorney, Agent, or Firm* — F. CHAU & ASSOCIATES, LLC

(57) ABSTRACT

An electronic product comprises: a sensing area that senses a touch, a non-sensing area adjacent to the sensing area and that does not sense a touch, a display panel that displays an image on a front surface, and a stack structure disposed on a rear surface of the display panel and that includes a plurality of conductive patterns that sense a touch. The plurality of conductive patterns includes first conductive patterns that extend across the sensing area and the non-sensing area. Each of the first conductive patterns has a first thickness in the sensing area and a second thickness in the non-sensing area that is less than the first thickness.

21 Claims, 18 Drawing Sheets

FIG. 11
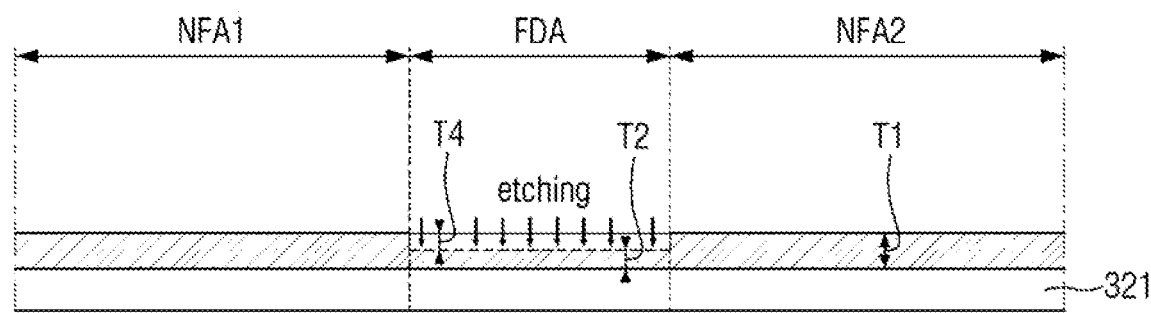
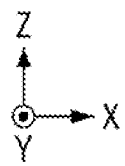

ELECTRONIC PRODUCTS

This application claims priority under 35 USC § 119 from Korean Patent Application No. 10-2021-0033153, filed on Mar. 15, 2021 in the Korean Intellectual Property Office, the contents of which are herein incorporated by reference in their entirety.

BACKGROUND

1. Technical Field

Embodiments of present disclosure are directed to electronic products.

2. Description of the Related Art

Electronic products refer to machines, apparatuses, devices and components included therein that are operated by electric current or magnetic fields. Such electronic products include conductive lines and/or conductive films for inputting/outputting or transmitting electrical signals or electromagnetic signals. Examples of these electronic products include, but are not limited to, a smart phone, a mobile phone, a tablet PC, a personal digital assistant (PDA), a portable multimedia player (PMP), a television set, a game machine, a wristwatch-type electronic device, a head-mounted display, a personal computer monitor, a laptop computer, an outdoor billboard, an electric vehicle, various medical apparatuses, various home appliances such as a refrigerator or a laundry machine, Internet of things (IoT) devices, etc.

Electronic products include lines or electrodes that transmit electrical signals. Electronic products may be placed in various stressful environments, depending on where they are used or fabricated. For some electronic products, different parts of the electronic products are subjected to different stressful environments. The lines disposed at different locations of electronic products may also be subjected to different levels of stress. Some continuous lines may extend across environments with different levels of. As different areas have different levels of stress, the lines passing through these areas should have different characteristics. For example, a line may be formed relatively thick in an area where the stress is low to have a low resistance, whereas the line may be formed relatively thin in an area where the stress is high in order to be flexible. In this manner, cracks caused by stress, etc., can be prevented In addition, as space utilization of the electronic products is improved or as the electronic products are designed for user convenience, the amount of stress applied to the electronic products can vary. For example, a portable electronic product may be designed so that its shape can be changed by a user to increase portability. Accordingly, a greater stress may be applied to an area of the product where the shape changes than in other areas.

SUMMARY

Embodiments of the present disclosure provide an electronic product that can prevent breakage of conductive lines or conductive films due to stress.

According to embodiments of the present disclosure, it is possible to prevent breakage of conductive lines or conductive films due to stress in an electronic product.

According to an embodiment of the present disclosure, an electronic product comprises a sensing area that senses a touch, a non-sensing area adjacent to the sensing area and that does not sense a touch, a display panel that displays an image on a front surface, and a stack structure on a rear surface of the display panel and that includes a plurality of conductive patterns that sense a touch. The plurality of conductive patterns include first conductive patterns that extend in a first direction across the sensing area and the non-sensing area. Each of the first conductive patterns has a first thickness in the sensing area and a second thickness in the non-sensing area that is less than the first thickness.

The first thickness may be at least twice the second thickness.

The stack structure may further comprise a digitizer layer that senses a touch from an electronic pen. The digitizer layer may comprise second conductive patterns that extend in a second direction that intersects the first direction, where the second conductive patterns are disposed in the sensing area, and an insulating layer interposed between the first conductive patterns and the second conductive patterns and that includes an insulating material.

Each of the first conductive patterns may comprise a first sub-region in the non-sensing area that has the uniform second thickness, and a second sub-region in the non-sensing area and that has a thickness that continuously increases from the second thickness to the first thickness.

The second conductive patterns may have a third thickness greater than the first thickness.

According to an embodiment of the present disclosure, an electronic product comprises a display panel, a first stress area and a second stress area, and a stack structure on the display panel and that includes a plurality of conductive patterns. The plurality of conductive patterns includes a first conductive pattern that extends across the first stress area and the second stress area. The first conductive pattern has a first thickness in the first stress area and a second thickness in the second stress area that is less than the first thickness. The first stress area is subjected to less stress than the second stress area.

The second stress area may be a foldable area that is bendable or foldable, and the first stress area may be a non-foldable area that is neither bent nor folded.

The first conductive pattern may have a cross-sectional shape in which a front surface thereof is depressed inwards in the foldable area.

The display panel may display images on a front side. The display panel and the stack structure may be folded toward the front side. The display panel includes a neutral plane that does not increase or decrease in length when the foldable area may be folded. The first conductive pattern may have a cross-sectional shape in which a rear surface thereof is depressed inwards in the foldable area.

The first thickness may be at least twice the second thickness.

The first conductive pattern may include a first sub-region in the foldable area that has the second thickness, and a second sub-region that has a thickness in the foldable area that continuously increases from the second thickness to the first thickness.

A width of the second sub-region may be not greater than one-third a width of the first sub-region.

The stack structure may comprise a digitizer layer on a rear surface of the display panel. The first conductive pattern may sense an external magnetic field or an external electromagnetic signal.

The digitizer layer may comprise a base layer that includes an insulating material and that is disposed on a rear surface of the first conductive pattern, and a second conductive pattern disposed on a rear surface of the base layer and that extends and intersects the first conductive pattern when viewed from above.

The second conductive patterns may be disposed in the non-foldable area.

Each of the first conductive pattern and the second conductive pattern may have a closed loop shape when viewed from above. A length of the closed loop of the second conductive pattern may be greater than the length of the closed loop of the first conductive pattern. The second conductive pattern may have a third thickness greater than the first thickness.

The first thickness may range from 4.0 to 8.0 μm, the second thickness may be equal to or greater than 1.0 μm and less than 2.5 μm, and the third thickness may range from 8.0 to 13.0 μm.

The digitizer layer may comprise a base layer that includes an insulating material, a second conductive pattern disposed on a rear surface of the base layer and that extends and intersects the first conductive pattern when viewed from above, a first adhesive layer that includes an insulating photopolymer resin and that is disposed on the first conductive pattern, and a second adhesive layer that includes an insulating photopolymer resin and that is disposed on the second conductive pattern. The base layer may be disposed on either a front surface of the first conductive pattern or a rear surface of the second conductive pattern.

The first conductive pattern may have a cross-sectional shape with a rear surface thereof that is depressed inwards towards the base layer. The base layer may be disposed on the front surface of the first conductive pattern. The first adhesive layer may be disposed between the first conductive pattern and the second conductive pattern. The second conductive pattern and the second adhesive layer may be disposed in the non-foldable area.

The base layer may be disposed on a rear surface of the second conductive patterns. The second adhesive layer may be disposed between the second conductive patterns and the first conductive patterns.

According to an embodiment of the present disclosure, an electronic product comprises a display panel that includes front surface that displays an image and a rear surface opposite to the front surface, and a foldable area and a non-foldable area, and a digitizer layer disposed on the rear surface of the display panel. The digitizer layer comprises a base layer that includes an insulating material, and a first conductive pattern and a second conductive pattern that are disposed on the base layer. The first conductive pattern extends across the foldable area and the non-foldable area in a first direction, and the second conductive pattern is disposed in the non-foldable area and extends across the first conductive pattern in a second direction that crosses the first direction, when viewed from above. The first conductive pattern has a first thickness in the foldable area and a second thickness in the non-foldable area that is less than the first thickness, and the second conductive pattern has a third thickness that is greater than the first thickness. The first conductive pattern senses an external magnetic field or external electromagnetic signal.

BRIEF DESCRIPTION OF THE DRAWINGS

FIG. 11 is a cross-sectional view that illustrates a method of forming first conductive patterns.

DETAILED DESCRIPTION

Figure 1:
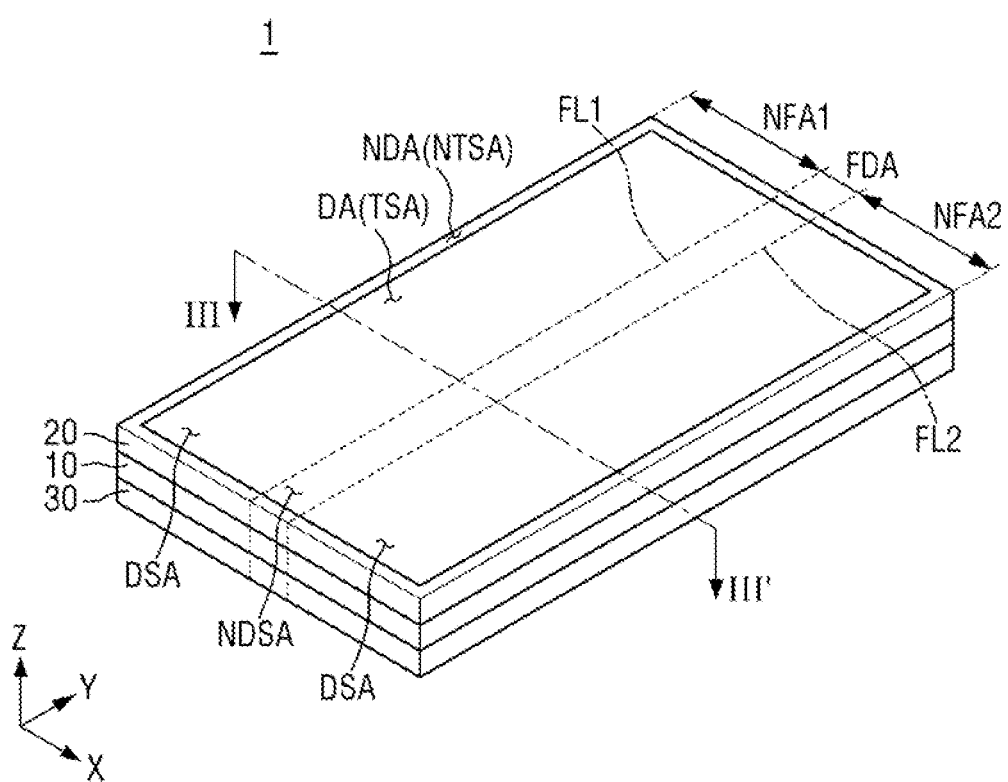
FIG. 1 is a perspective view of a display device according to an embodiment of the present disclosure.

In the following description, like reference numerals may denote like elements.

When an element, such as a layer, is referred to as being "on," "connected to," or "coupled to" another element or layer, it may be directly on, connected to, or coupled to the other element or layer or intervening elements or layers may be present. Further, the X-axis, the Y-axis, and the Z-axis are not limited to three axes of a rectangular coordinate system, such as the x, y, and z axes, and may be interpreted in a broader sense.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

For example, "about" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

FIG. 1 is a perspective view of a display device according to an embodiment of the present disclosure.

Hereinafter, a display device will be described in detail as an example of an electronic product according to embodiments of the present disclosure. It should be noted that the technical idea of the embodiments is not limited to a display device but may also apply to any of a variety of electronic products mentioned above.

In addition, a foldable display device will be described as an example of a display device placed in stressful environments. A foldable display device includes a foldable area and a non-foldable area, and these areas are subject to different levels of stress depending on whether or not the areas are folded. Accordingly, such a foldable display device will be described as an example because it is suitable for describing different characteristics of lines placed in the various stressful environments described above. In addition to a foldable display device, various types of flexible display devices that have a changeable shape, such as a bendable display device, a rollable display device or a stretchable display device, will similarly have areas subject to different levels of stress, although they will not be described with reference to the drawings. Accordingly, it will be understood that the following descriptions can be equally applied to various other types of flexible display devices.

Figure 2:
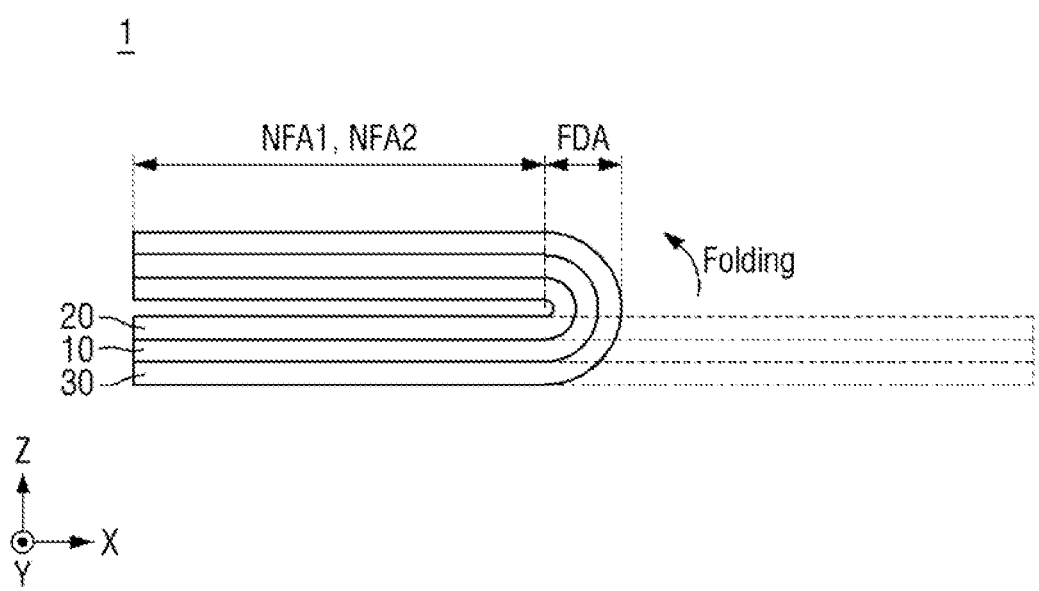
FIG. 2 is a cross-sectional view of a display device of FIG. 1 when it is folded.

FIG. 2 is a cross-sectional view of the display device of FIG. 1 when it is folded. In FIGS. 1 and 2, a first direction X, a second direction Y and a third direction Z are indicated.

The first direction X refers to a direction parallel to a side of the display device 1, for example, a horizontal direction of the display device 1 when viewed from above. A second direction Y refers to a direction parallel to another side of the display device 1 that meets the side of the display device 1, for example, a vertical direction of the display device 1, when viewed from above. A third direction Z refers to a thickness direction of the display device 1 that is perpendicular to a plane defined by the X direction and the Y direction. It should be understood that the directions referred to in the embodiments are relative directions, and the embodiments are not limited to the directions mentioned.

Referring to FIGS. 1 and 2, in some embodiments, a display device 1 has a substantially rectangular or square shape when viewed from above. The display device 1 is a rectangle that has corners at the right angle or rounded corners when viewed from above. The display device 1 includes four sides or edges.

In some embodiments, at least one of the front surface and the rear surface of the display device 1 is a display surface. As used herein, the front surface refers to a first surface located on one side of one plane, and the rear surface refers to a second or opposite surface located on the opposite side of the plane.

According to an embodiment of the present disclosure, the display surface is located on the front surface of the display device 1, and no image is displayed on the rear surface. According to the embodiments of the present disclosure, in the following description, images are displayed only on the front surface of the display devices. However, embodiments are not limited thereto, and in other embodiments, the display device 1 can be a double-sided display device in which images are displayed on both front and rear surfaces.

In some embodiments, the display device 1 is divided into a display area DA (or display active area) that can display an image or a video, and a non-display area NDA (or display inactive area) disposed around the display area DA when viewed from above.

In some embodiments, the display area DA includes a plurality of pixels. Each of the pixels is a unit for displaying an image. The pixels include, but are not limited to, a red pixel, a green pixel and a blue pixel. A plurality of pixels are arranged sequentially and repeatedly when viewed from above. For example, the pixels are arranged in, but are not limited to, a matrix.

In some embodiments, the non-display area NDA is disposed around the display area DA. A black matrix is disposed in the non-display area NDA to prevent leakage of light from adjacent pixels.

In some embodiments, the non-display area NDA surrounds the display area DA as shown in FIGS. 1 and 2. Specifically, the display area DA has a rectangular shape, and the non-display area NDA is disposed along the four sides of the display area DA. However, embodiments of the present disclosure are not limited thereto. In other embodiments, the display area DA is partially surrounded by the non-display area NDA. For example, the non-display area NDA is disposed only along three sides of the display area DA. In such case, the other side of the display area DA may form an edge of the display device 1. In other embodiments, the non-display area NDA may be disposed along two sides of the display area DA, or along one side of the display area DA.

In some embodiments, the display device 1 is a foldable display device 1 that can remain folded as well as unfolded. According to an embodiment of the present disclosure, display device 1 can be folded inward (in-folding manner) so that the display surface is located inside, as shown in FIG. 2. When the display device 1 is folded inward (in-folding), a part of the front surface of the display device 1 faces the other part thereof. Alternatively, the display device 1 can be folded outward (out-folding manner) such that the display surface is located outside. When the display device 1 is folded outward, a part of the rear surface of the display device 1 faces the other part thereof.

In some embodiments, the display device 1 includes a foldable area FDA, a first non-foldable area NFA1, and a second non-foldable area NFA2. The display device 1 can be bent or folded in the foldable area FDA, while it cannot be bent or folded in the first non-foldable area NFA1 or the second non-foldable area NFA2.

In some embodiments, when the shape of the display device 1 changes, stress can occur. For example, when the display device 1 is folded, stress ise applied to the foldable area FDA. Accordingly, a larger stress is applied to the foldable area FDA. On the other hand, a lesser stress is applied to the first non-foldable area NFA1 and the second non-foldable area NFA2.

In some embodiments, the first non-foldable area NFA1 is disposed on one side of the foldable area FDA, and the second non-foldable area NFA2 is disposed on the opposite side of the foldable area FDA.

The foldable area FDA is defined by a first folding line FL1 and a second folding line FL2. The first folding line FL1 is a boundary between the foldable area FDA and the first non-foldable area NFA1, and the second folding line FL2 is s boundary between the foldable area FDA and the second non-foldable area NFA2.

In some embodiments, each of the first folding line FL1 and the second folding line FL2 is straight line. According to an embodiment of the present disclosure, the first folding line FL1 and the second folding line FL2 extend in parallel in the second direction Y. The first folding line FL1 and the second folding line FL2 traverse the display device 1 along the second direction Y. The first folding line FL1 and the second folding line FL2 are separated by a predetermined interval in the X direction.

In some embodiments, the length of the first folding line FL1 is equal to the length of the second folding line FL2.

The length is equal to the length of the foldable area FDA in the second direction Y. The length of the first non-foldable area NFA1 in the second direction Y is equal to that of the second non-foldable area NFA2. The length of the non-foldable areas is equal to the length of the foldable area FDA in the second direction Y. However, embodiments of the present disclosure are not limited thereto.

In some embodiments, when the first folding line FL1 and the second folding line FL2 extend in the second direction Y, the width of the foldable area FDA in the first direction X is less than the length in the second direction Y. The width of the foldable area FDA in the first direction X is less than the width of the first non-foldable area NFA1 and the width of the second non-foldable area NFA2 in the first direction X.

In some embodiments, the width of the first non-foldable area NFA1 may be equal to that of the second non-foldable area NFA2 in the first direction X, but embodiments are not limited thereto. In addition, the widths of the first non-foldable area NFA1 and the second non-foldable area NFA2 in the first direction X may be greater than the length of the first non-foldable area NFA1 and the second non-foldable area NFA2 in the second direction Y, respectively. However, embodiments of the present disclosure are not limited thereto.

In some embodiments, each of the display area DA and the non-display area NDA overlap at least one of the foldable area FDA, the first non-foldable area NFA1, or the second non-foldable area NFA2. In an embodiment shown in FIGS. 1 and 2, each of the display area DA and the non-display area NDA overlaps the foldable area FDA, the first non-foldable area NFA1 and the second non-foldable area NFA2. That is to say, as shown in FIGS. 1 and 2, the display area DA and the non-display area NDA continuously extend regardless of the boundaries of the non-foldable areas NFA and the folding lines FL1 and FL2. Accordingly, each of the display area DA and the non-display area NDA overlaps different areas with different stresses as the display device 1 is folded.

In some embodiments, the display device 1 is divided into a touch sensing area TSA and a non-touch sensing area NTSA, depending on whether or not a touch input can be sensed. Herein, the touch is a touch by a part of a person's body, such as a finger.

In addition, in some embodiments, the display device 1 is divided into digitizer sensing areas DSA1 and DSA2 and a non-digitizer sensing area NDSA, depending on whether or not proximity or contact by an electronic pen, such as a stylus pen, can be sensed. The digitizer sensing areas DSA1 and DSA2 and the non-digitizer sensing area NDSA will be described in detail below with reference to FIG. 5.

In some embodiments, each of the touch sensing area TSA and the touch non-sensing area NTSA are disposed across the non-foldable areas NFA and the foldable area FDA. The shape of the touch sensing area TSA is rectangular, optionally with rounded corners. The shape of the touch sensing area TSA is rectangular with the length in the second direction Y being greater than the width in the first direction X. However, embodiments of the present disclosure are not limited thereto. In other embodiments, the touch sensing area TSA may have a rectangular shape whose sides in the first direction X are longer than its sides in the second direction Y, a square shape, other polygonal shapes such as a diamond shape, a circular shape, or an elliptical shape.

In some embodiments, the non-touch sensing area NTSA surrounds all sides of the touch sensing area TSA. However, embodiments of the present disclosure are not limited thereto. For example, the non-touch sensing area NTSA is not disposed adjacent to least one of the sides of the touch sensing area TSA.

In an embodiment shown in FIG. 1, the display area DA completely corresponds to the touch sensing area TSA, and the non-display area NDA completely corresponds to the non-touch sensing area NTSA, but embodiments of the present disclosure are not limited thereto. In other embodiments, at least a part of the non-display area NDA overlaps the touch sensing area TSA.

In some embodiments, the display device 1 includes a display panel 10 that displays images or videos, a front stack structure 20 disposed on the front side of the display panel 10, and a rear stack structure 30 disposed on the rear side of the display panel 10.

In some embodiments, the display panel 10 includes light-emitting elements that emit light in response to an electrical signal, and a plurality of thin-film transistors that control the light emitting elements. Accordingly, the display panel 10 further includes conductive lines or electrodes that form the thin film transistors or transmit electrical signals to the thin film transistors.

In some embodiments, the front stack structure 20 and the rear stack structure 30 may protect the display panel 10 or may provide additional electrical, physical, or optical functions to the display device 1. One of the layers or elements that form each of the front stack structure 20 and the rear stack structure 30 includes conductive lines or electrodes. Examples of the conductive lines or electrodes include, but are not limited to, conductive lines in a touch member that can sense a touch input from a user's body part, such as a finger, and conductive lines of the digitizer layer that can sense a touch input from an electronic pen, such as a stylus pen.

As such, in some embodiments, the display device 1 includes lines for various functions. At least some of the lines extend across different stress environments. Some lines, which are less flexible, may crack or be disconnected if they are repeatedly exposed to severe stress levels, such as in the foldable area FDA. Accordingly, to ensure the reliability of the lines, the lines that pass through the foldable area FDA should be sufficiently flexible. Typically, the flexibility of a line is inversely proportional to the thickness of the line. Accordingly, the flexibility of a line can be improved by reducing the thickness of the line. However, a thin line has higher electrical resistance, which reduces signal transmission characteristics. In view of the above, the lines that extend across different stress environments have a larger first thickness T1 in an area subject to relatively low stress levels, and a smaller second thickness T2 in an area subject to relatively high stress levels, to be both flexible and to transmit signals. A detailed description thereof will be given below. In the following description, conductive lines of the digitizer layer 320 (see FIG. 3) will be described as an example of these lines. However, embodiments are not limited thereto, and in other embodiments, the technical idea can be equally applied to the other lines of the display device 1.

Hereinafter, the display panel 10, the front stack structure 20 and the rear stack structure 30 will be described in detail.

Figure 3:
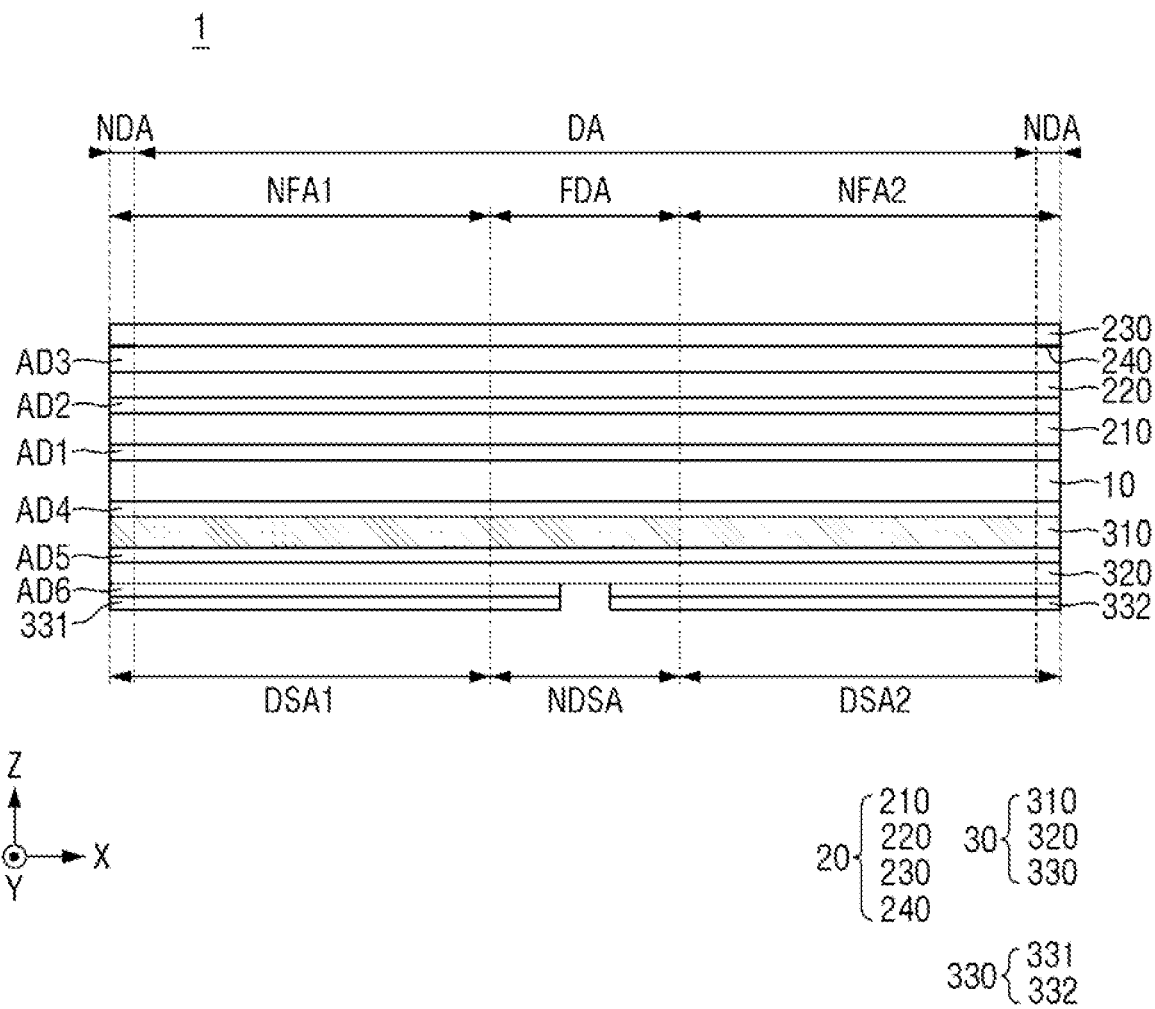
FIG. 3 is a cross-sectional view of a display device taken along line III-III' of FIG. 1.

FIG. 3 is a cross-sectional view of an example of a display device taken along line III-III' of FIG. 1.

Referring to FIGS. 1 to 3, the display device 1 according to an embodiment includes the display panel 10, the front stack structure 20 disposed on the front side of the display panel 10, and the rear stack structure 30 disposed on the rear side of the display panel 10.

In some embodiments, the display panel 10 displays images and may include a self-luminous display panel, such as an organic light-emitting display panel (OLED), an inorganic light-emitting display panel (inorganic EL), a quantum-dot light-emitting display panel (QED), a micro LED display panel (micro-LED), a nano LED display panel (nano-LED), a plasma display panel (PDP), a field emission display panel (FED), or a cathode ray display panel (CRT), as well as a light-receiving display panel, such as a liquid-crystal display panel (LCD) or an electrophoretic display panel (EPD). In the following description, an organic light-emitting display panel will be described as an example of the display panel 10, and the organic light-emitting display panel will be simply referred to as the display panel 10 unless specifically stated otherwise. However, embodiments of the present disclosure are not limited to an organic light-emitting display panel, and other embodiments can use any other display panel listed above or well known in the art without departing from the scope of the present disclosure.

Figure 4:
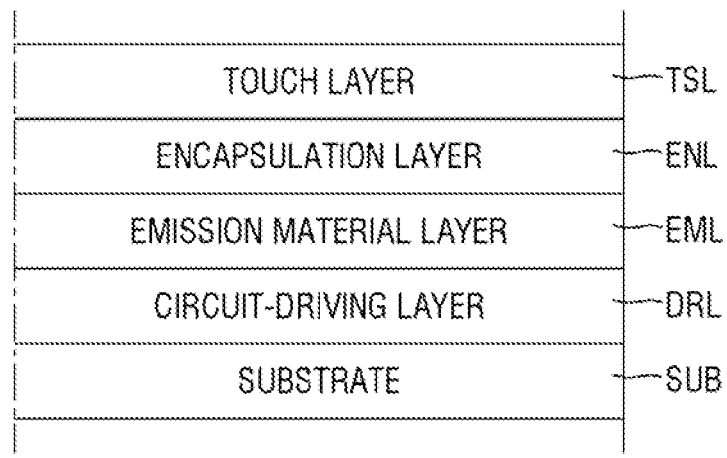
FIG. 4 is a cross-sectional view of a display panel of FIG. 3.

FIG. 4 is a cross-sectional view of a display panel of FIG. 3.

Referring to FIG. 4, in some embodiments, the display panel 10 includes a substrate SUB, a circuit driving layer DRL on the substrate SUB, an emission material layer EML on the circuit driving layer DRL, an encapsulation layer ENL on the emission material layer EML, and a touch layer TSL on the encapsulation layer ENL.

In some embodiments, the substrate SUB is a flexible substrate that includes a flexible polymer material such as polyimide. Accordingly, the display panel 10 can be curved, bent, folded, or rolled. In some embodiments, the substrate SUB includes a plurality of sub-substrates that overlap one another in the thickness direction with barrier layers therebetween. In such cases, each of the sub-substrates is a flexible substrate.

In some embodiments, the circuit-driving layer DRL is disposed on the substrate SUB. The circuit-driving layer DRL includes a circuit that drives an emission material layer EML of each pixel. The circuit-driving layer DRL includes a plurality of thin-film transistors, and lines that transmit electrical signals to the plurality of thin-film transistors.

In some embodiments, the emission material layer EML is disposed on the circuit-driving layer DRL. The emission material layer EML emits light with various luminances that depend on the driving signals received from the circuit-driving layer DRL. The emission material layer EML includes an organic light-emitting element that includes an anode electrode and a cathode electrode through which an electrical signal is transmitted.

In some embodiments, the encapsulation layer ENL is disposed on the emission material layer EML. The encapsulation layer ENL includes at least one inorganic layer that prevents permeation of oxygen or moisture into the emission material layer EML. In addition, the encapsulation layer ENL includes at least one organic film that protects the emission material layer EML from particles such as dust.

In some embodiments, the touch layer TSL is disposed on the encapsulation layer ENL. The touch layer TSL can sense a touch input and perform the functions of the touch member. The touch layer TSL includes a plurality of sensing areas and sensing lines.

Although FIG. 4 shows that the touch member is integrated into the display panel 10 in the form of the touch layer TSL, embodiments of the present disclosure are not limited thereto. For example, the touch member may be implemented as a panel or film separate from the display panel 10 and attached to the display panel 10. In this embodiment, the touch member is included in the front stack structure 20. In other embodiments, the touch member can be eliminated.

As described above, in some embodiments, the display panel 10 includes lines or electrodes in each of the circuit-driving layer DRL, the emission material layer EML and the touch layer TSL. The technical idea can be equally applied to embodiments where the lines or electrodes in the display panel 10 are arranged across the foldable area FDA and the non-foldable areas NFA and accordingly are placed in different stressful environments, which will not be described in detail herein.

Referring back to FIG. 3, in some embodiments, the front stack structure 20 and the rear stack structure 30 disposed on the display panel 10 include layers that perform different functions. The front stack structure 20 disposed on the front surface of the display panel 10 where images are displayed includes, for example, a polarizing film 210, a window 220, a window protection film 230, a light-blocking layer 240, and/or adhesive members that attaching them. The rear stack structure 30 disposed on the rear surface of the display panel 10 where no image is displayed includes a panel-bottom protection film 310, a digitizer layer 320, and/or a shielding member 330.

More specifically, in some embodiments, the polarizing film 210 is attached onto the front surface of the display panel 10 through a first adhesive member AD1. The polarizing film 210 reduces reflection of external light.

In some embodiments, a window 220 is disposed on the polarizing film 210. The window 220 is made of a transparent material, and may include, for example, glass or plastic. When the window 220 includes glass, an ultra thin glass (UTG) that has a thickness of 0.1 mm or less is used to maintain flexibility. When the window 220 is made of plastic, the window 220 may include, but is not limited to, a transparent polyimide film. The window 220 is attached to the front surface of the polarizing film 210 by a second adhesive member AD2.

In some embodiments, the window protection film 230 is disposed on the window 220. The window protection film 230 is attached to the front surface of the window 220 by a third adhesive member AD3. The window protection film 230 performs at least one of several functions, such as anti-scattering when the window 220 is broken, shock absorption, anti-scratch, anti-fingerprint, or anti-glare. The window protection film 230 is made of a resin or film that is flexible.

In some embodiments, each of the first to third adhesive members AD1, AD2 and AD3 includes a transparent adhesive film or a transparent adhesive resin.

In some embodiments, the light-blocking layer 240 is disposed in the non-display area NDA. The light-blocking layer 240 includes a material that can block light. For example, the light-blocking layer 240 includes an inorganic black pigment such as carbon black or an organic black pigment. Although the drawing shows that the light-blocking layer 240 is formed on the rear surface of the window protection film 230, embodiments of the present disclosure are not limited thereto. The light-blocking layer 240 may be disposed on the front and/or rear surface of the window 220, or may be disposed on the front surface of the window protection film 230.

In some embodiments, all of the elements of the above-described front stack structure 20 are disposed across the first non-foldable area NFA1, the foldable area FDA, and the second non-foldable area NFA2 of the display device 1. When the display device 1 is folded, the front stack structure 20 is also folded. Accordingly, all of the layers of the front stack structure 20 are formed of a foldable material or structure. Unlike the rear stack structure 30 to be described below, the front stack structure 20 disposed on the front surface of the display panel 10 has the same thickness and shape in the foldable area FDA as in the first non-foldable area NFA1 and the first non-foldable area NFA1. However, the embodiments of the present disclosure are not limited thereto. For example, when the touch member is disposed on the front surface of the display panel 10 as a separate layer, the sensing electrodes in the touch member are thinner in the foldable area FDA than in the non-foldable areas NFA.

in some embodiments, the panel-bottom protection film 310 is disposed on the rear surface of the display panel 10. The panel-bottom protection film 310 is attached to the rear surface of the display panel 10 by a fourth adhesive member AD4. The panel-bottom protection film 310 supports the display panel 10 and protects the rear surface of the display panel 10. The panel-bottom protection film 310 includes, but is not limited to, a plastic film such as a polyethylene terephthalate (PET) film.

Although FIG. 3 shows that the panel-bottom protection film 310 is integrally formed and disposed in the first non-foldable area NFA1, the foldable area FDA and the second non-foldable area NFA2, embodiments of the present disclosure are not limited thereto. For example, in other embodiments, the panel-bottom protection film 310 is not disposed at the foldable area FDA and disposed in the first non-foldable area NFA1 and the second non-foldable area NFA2 to reduce stress applied to the foldable area FDA when the display device 1 is folded.

In some embodiments, the digitizer layer 320 is attached on the rear surface of the panel-bottom protection film 310 through a fifth adhesive member AD5. The digitizer layer 320 includes lines that sense proximity or contact of an electronic pen, such as a stylus pen, that supports electromagnetic resonance (EMR) technology. The lines are a conductive pattern that includes a conductive material such as a metal. The conductive patterns of the digitizer layer 320 sense a magnetic field or an electromagnetic signal. For example, when an electronic pen is placed on the front surface of the display device 1 and a magnetic field or an electromagnetic signal is generated through the electronic pen, the generated magnetic field or electromagnetic signal is input to the conductive patterns of the digitizer layer 320. The digitizer layer 320 determines input coordinates of the electronic pen by analyzing the magnitude of the magnetic field or electromagnetic signal input for each location.

Figure 5:
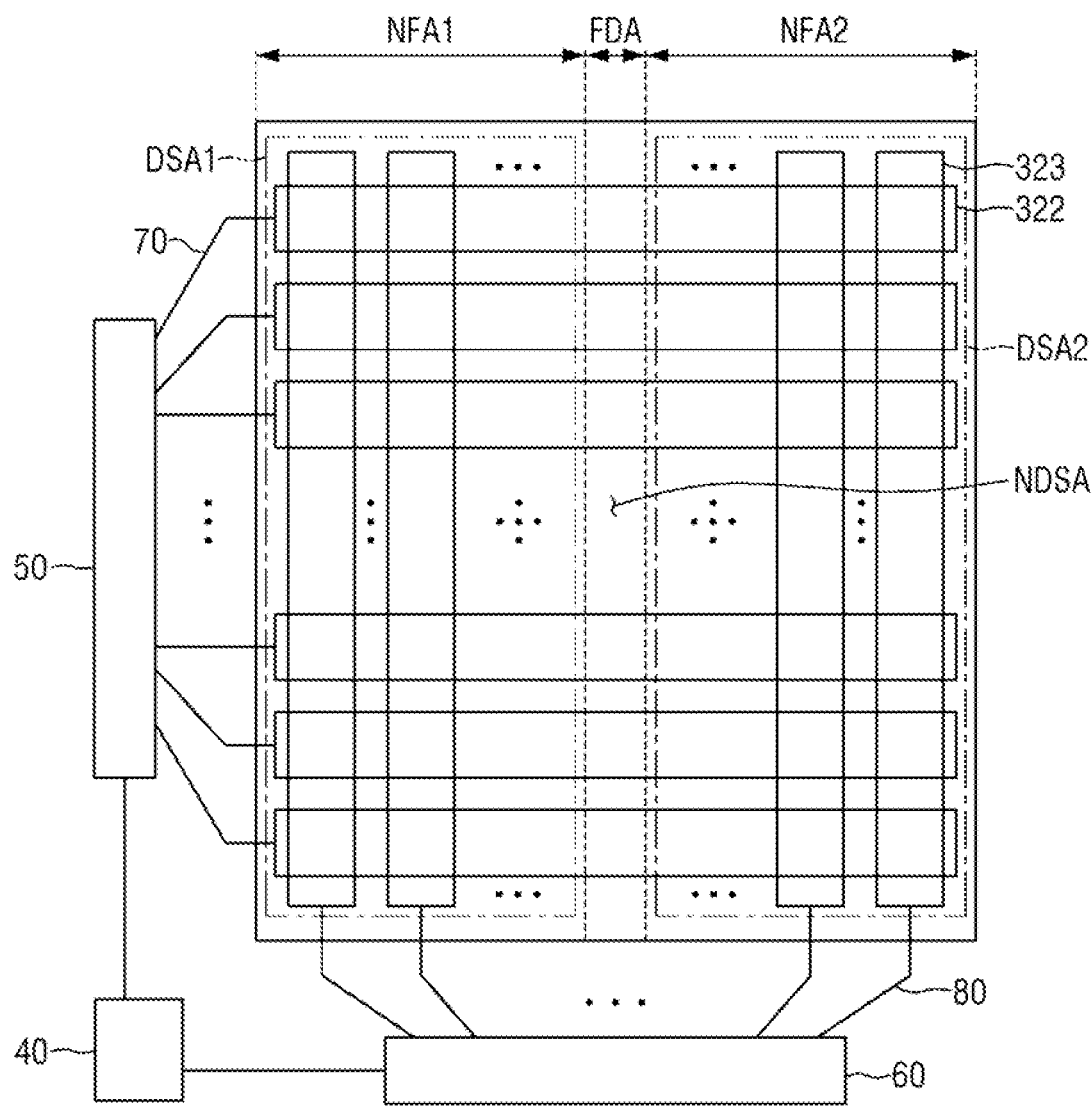
FIG. 5 is a block diagram of a digitizer layer of FIG. 3.

FIG. 5 is a block diagram of the digitizer layer 320 according to some embodiments.

Referring to FIG. 5, in some embodiments, the display device 1 includes a first signal processor 50, a second signal processor 60, and a controller 40 that drives the digitizer layer 320. The digitizer layer 320 includes first conductive patterns 322 that extend in a first direction X, and second conductive patterns 323 that extend in a second direction Y that crosses the first direction X.

In some embodiments, the first signal processor 50 transmits an electromagnetic signal to each of the first conductive patterns 322 or receives an electromagnetic signal absorbed by each of the first conductive patterns 322. The second signal processor 60 transmits an electromagnetic signal to each of the second conductive patterns 323 or receives an electromagnetic signal absorbed by each of the second conductive patterns 323. The controller 40 controls the overall driving of the digitizer layer 320, and outputs proximity or contact information of an electronic pen through the electromagnetic signals received from the first signal processor 50 and the second signal processor 60. Although FIG. 5 shows each of the first signal processor 50, the second signal processor 60 and the controller 40 as a separate block for convenience of illustration, embodiments of the present disclosure are not limited thereto. In other embodiments, each of the first signal processor 50, the second signal processor 60 and the controller 40 can be implemented as a single module, unit or chip.

In some embodiments, the first conductive patterns 322 and the second conductive patterns 323 intersect each other when viewed from above. The magnetic field or electromagnetic signal emitted from an electronic pen is absorbed by the first conductive patterns 322 and the second conductive patterns 323. The electromagnetic signal absorbed by the first conductive patterns 322 is transmitted to the controller 40 through the first signal processor 50, and the electromagnetic signal absorbed by the second conductive patterns 323 is transmitted to the controller 40 through the second signal processor 60. The controller 40 determines the position of the electronic pen in the digitizer layer 320 based on coordinates from the above-described intersection structure.

In some embodiments, at least some of the first electrode patterns 322 and the second electrode patterns 323 generate a magnetic field in response to an input current received from the first signal processor 50 and/or the second signal processor 60, and the generated magnetic field is absorbed by the electronic pen. The electronic pen re-emits the absorbed magnetic field, and the magnetic field emitted by the electronic pen is absorbed by the first conductive patterns 322 and the second conductive patterns 323. In this manner, the controller 40 determines the position of the electronic pen in the digitizer layer 320 based on coordinates as described above.

In an embodiment shown in FIG. 5, the first conductive patterns 322 and the first signal processor 50 are electrically connected by first connection lines 70 disposed on one side of the display device 1. However, embodiments are not limited thereto, and in other embodiments, the first conductive patterns 322 and the first signal processor 50 are electrically connected by first connection lines 70 that are sequentially and alternately arranged on both sides. According to this embodiment, the bezel width of both sides of the display device 1 is reduced by reducing the number of first connection lines 70 disposed on both sides of the display device 1.

In addition, although FIG. 5 shows that the second conductive patterns 323 and the second signal processor 60 are electrically connected by second connection lines 80 disposed on one side of the display device 1, embodiments of the present disclosure are not limited thereto.

In some embodiments, the display device 1 and the digitizer layer 320 are divided into the digitizer sensing areas DSA1 and DSA2 and the non-digitizer sensing area NDSA. The digitizer sensing areas DSA1 and DSA2 include the above-described intersection structure formed by the first conductive patterns 322 and the second conductive patterns 323. As each of the first conductive patterns 322 of the digitizer layer 320 is thinner in the non-digitizer sensing area NDSA, proximity or contact by an electronic penis not sensed therein and no electric signal is transmitted. The second conductive patterns 323 are not disposed in the non-digitizer sensing area NDSA.

In some embodiments, even if the non-digitizer sensing area NDSA does not sense proximity or contact of an electronic pen, a user may feel as if the electronic pen is sensed. Specifically, although the contact or proximity of the electronic pen is not actually sensed in the non-digitizer sensing area NDSA, a user may feel as if the electronic pen comes in contact or is proximate and is sensed by using software compensation. Although the contact or proximity of the electronic pen is not accurately sensed in the non-digitizer sensing area NDSA because it is sensed only in one of the intersecting directions, a user may feel as if the electronic pen is sensed based on calculated coordinates by using software compensation.

In some embodiments, each of the digitizer sensing areas DSA1 and DSA2 and the non-digitizer sensing area NDSA extends regardless of the boundary between the display area DA and the non-display area NDA. Likewise, each of the digitizer sensing areas DSA1 and DSA2 and the non-digitizer sensing area NDSA extends regardless of the boundary between the touch sensing area TSA and the non-touch sensing area NTSA.

As a non-limiting embodiment, the first digitizer sensing area DSA1 overlaps the display area DA and the touch sensing area TSA of the first non-foldable area NFA1, the second digitizer sensing area DSA2 overlaps the display area DA and the touch sensing area TSA of the second non-foldable area NFA2, and the non-digitizer sensing area overlaps the display area DA and the touch sensing area TSA of the foldable area FDA.

In some embodiments, the first digitizer sensing area DSA1 overlaps the first non-foldable area NFA1, the second digitizer sensing area DSA2 overlaps the second non-foldable area NFA2, and the non-digitizer sensing area NDSA overlaps the foldable area FDA. The width of the non-digitizer sensing area NDSA in the first direction X is substantially equal to the width of the foldable area FDA in the first direction X. The distance between the first digitizer sensing area DSA1 and the second digitizer sensing area DSA2 in the first direction X is substantially equal to the width of the foldable area FDA in the first direction X. According to another embodiment, the width of the non-digitizer sensing area NDSA in the first direction X is less than the width of the foldable area FDA in the first direction X. Accordingly, the distance between the first digitizer sensing area DSA1 and the second digitizer sensing area DSA2 in the first direction X is lass than the width of the foldable area FDA in the first direction X. The first digitizer sensing area DSA1 and the second digitizer sensing area DSA2 overlap at least partially with the foldable area FDA.

Figure 6:
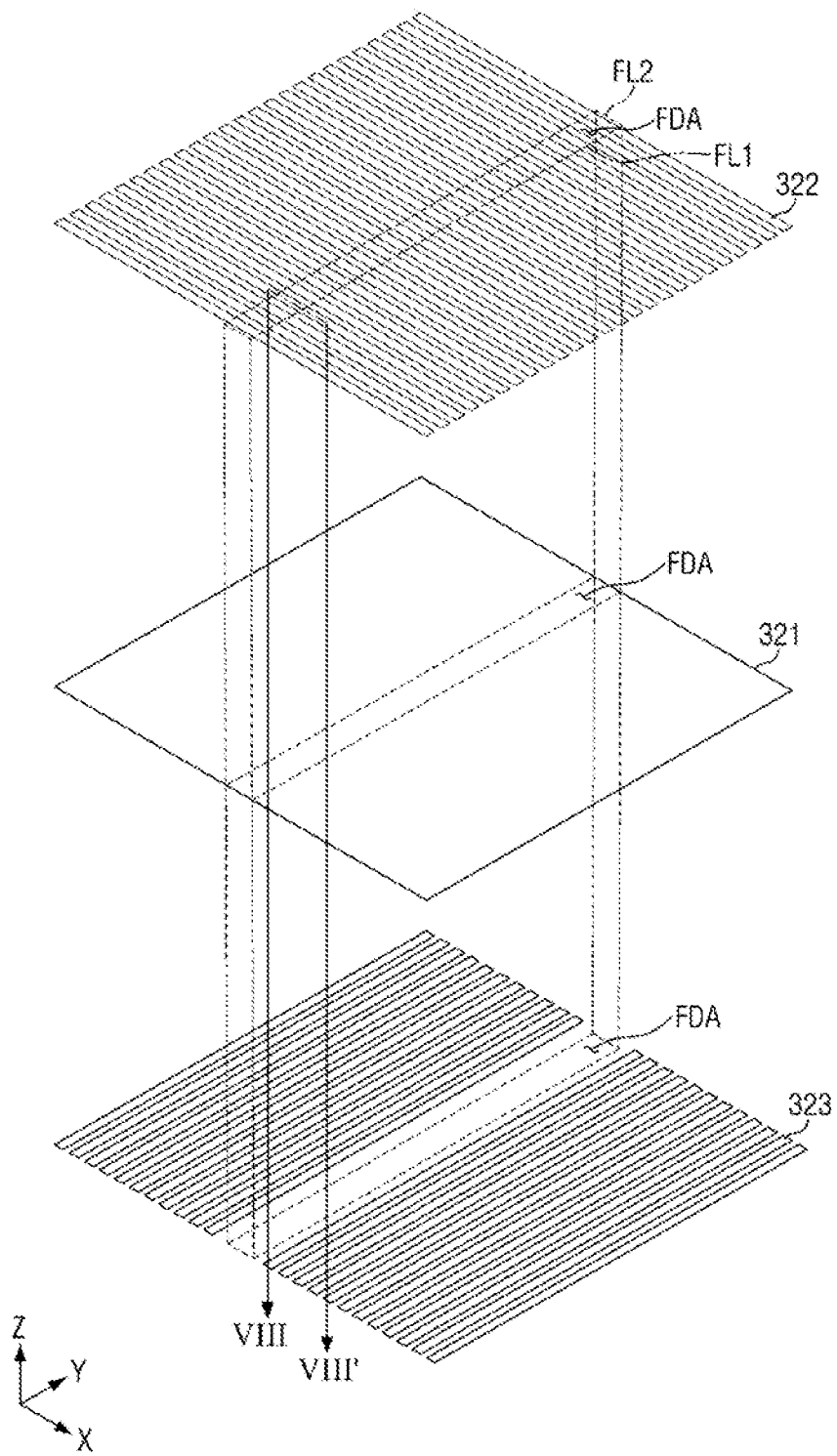
FIG. 6 is an exploded perspective view of a digitizer layer of FIG. 3.
Figure 7:
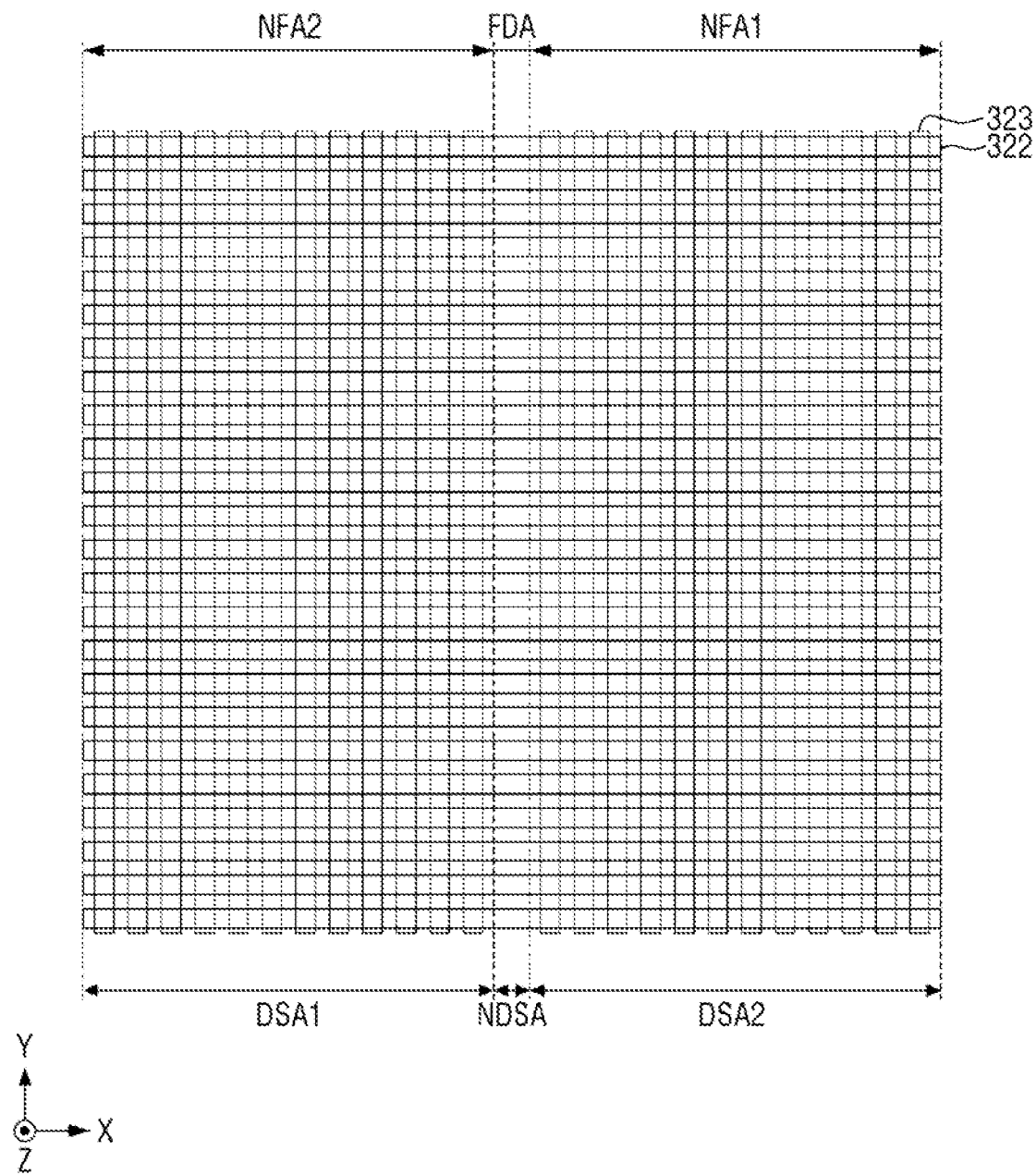
FIG. 7 is a plan view of a layout of first conductive patterns and second conductive patterns when viewed from above.
Figure 8:
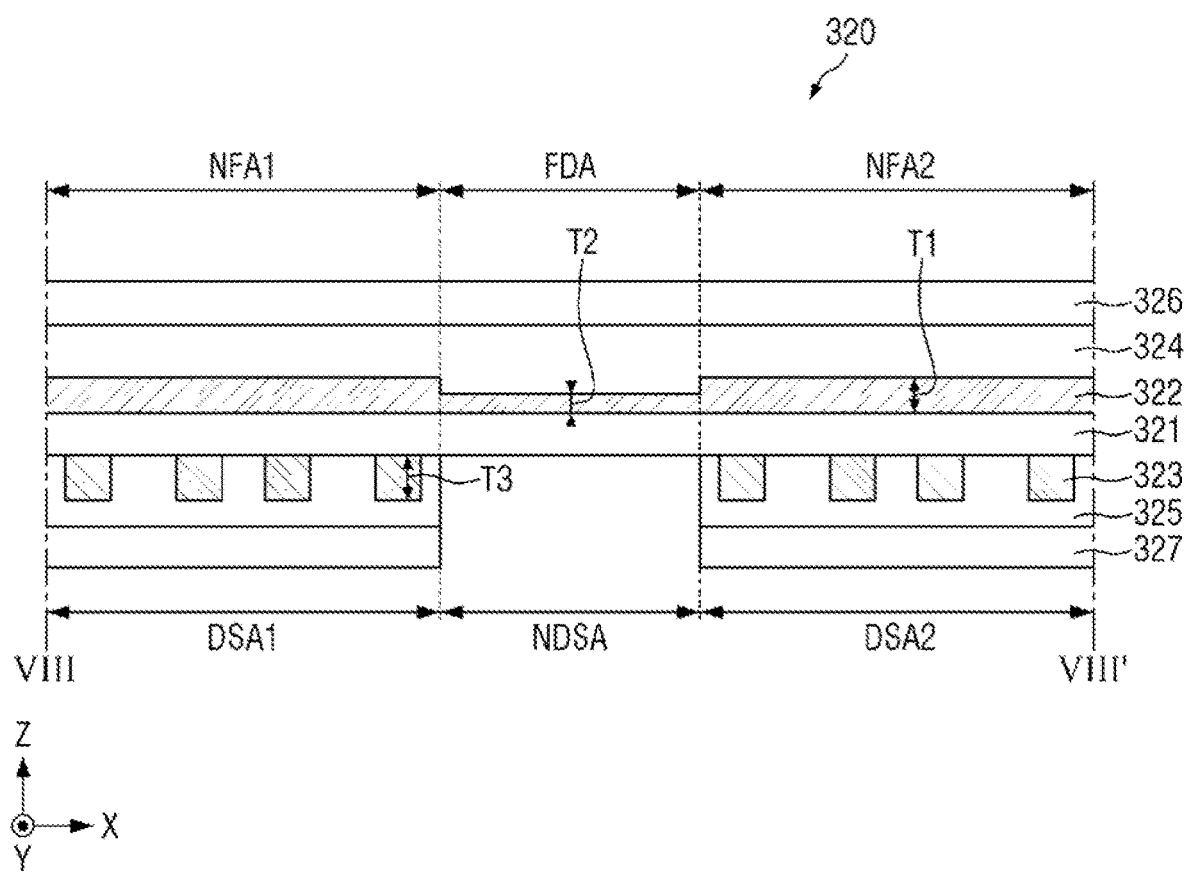
FIG. 8 is a cross-sectional view of a digitizer layer, taken along line VIII-VIII' of FIG. 6.

FIG. 6 is an exploded perspective view of a digitizer layer of FIG. 3. FIG. 7 is a plan view of a layout of first conductive patterns and second conductive patterns when viewed from above. FIG. 8 is a cross-sectional view of the digitizer layer, taken along line VIII-VIII' of FIG. 6.

Referring to FIGS. 6 to 8, in some embodiments, the digitizer layer 320 furthers include a base layer 321 disposed between the first conductive patterns 322 and the second conductive patterns 323, a first adhesive layer 324 disposed on the front surface of the first conductive patterns 322, a first cover layer 326 disposed on the front surface of the first adhesive layer 324, a second adhesive layer 325 disposed on the rear surface of the second conductive patterns 323, and a second cover layer 327 disposed on the rear surface of the second adhesive layer 325.

In some embodiments, the base layer 321 is a substrate on which the first conductive patterns 322 and the second conductive patterns 323 are disposed. The base layer 321 includes an insulating material that electrically separates the first conductive patterns 322 from the second conductive patterns 323. For example, the base layer 321 includes, but is not limited to, polyimide.

In some embodiments, the first conductive patterns 322 are disposed on the front surface of the base layer 321. Each of the first conductive patterns 322 extends in the first direction X. The first conductive patterns 322 are arranged in the second direction Y. Each of the first conductive patterns 322 has a closed loop structure shape (e.g., a rectangle) when viewed from above.

In some embodiments, the second conductive patterns 323 are disposed on the rear surface of the base layer 321. Each of the second conductive patterns 323 extend in the second direction Y. The second conductive patterns 323 are arranged in the first direction X. Each of the second conductive patterns 323 has a closed loop structure shape (e.g., a rectangle) when viewed from above.

In some embodiments, each of the first conductive patterns 322 and the second conductive patterns 323 includes a metal such as copper (Cu), silver (Ag), nickel (Ni) or tungsten (W).

Although each of the first conductive patterns 322 and the second conductive patterns 323 has a rectangular, closed-loop structure when viewed from above, embodiments of the present disclosure are not limited thereto. Each of the first conductive patterns 322 and the second conductive patterns 323 may have a variety of types of loop structures in other embodiments, including a diamond, a polygon such as a pentagon or a hexagon, a circle, an oval, etc. when viewed from above.

In some embodiments, as the first conductive patterns 322 extend in the first direction X, which is perpendicular to the folding lines FL1 and FL2, they are disposed across the foldable area FDA and the non-foldable areas NFA which are subject to different magnitudes of stress when the display device 1 is folded. However, embodiments of the present disclosure are not limited thereto. For example, in other embodiments, the first conductive patterns 322 can extend in a direction that forms an acute or obtuse angle with the extension direction of the folding lines FL1 and FL2, and are arranged across the first non-foldable area NFA1, the foldable area FDA and the second non-foldable area NFA2.

In some embodiments, each of the first conductive patterns 322 has a first thickness T1 in the first non-foldable area NFA1 and the second non-foldable area NFA2 where the folding stress is relatively low to have good signal transmission characteristics, whereas it may have a second thickness T2 in the foldable area FDA where the folding stress s relatively high to have sufficient flexibility. The first thickness T1 is at least twice the second thickness T2. For example, the first thickness T1 ranges from 4.0 to 8.0 μm or from 6.0 to 7.0 μm. The second thickness T2 is equal to or greater than 1.0 and less than 2.5 μm. In some embodiments, the second thickness T2 ranges from 1.0 to 2.0 μm. However, embodiments of the present disclosure are not limited thereto. The first thickness T1 and the second thickness T2 are determined depending on a stress environment and required characteristics.

In some embodiments, a cross-sectional shape of each of the first conductive patterns 322 has a shape in which the front surface is depressed inwards toward the base layer 321 in the foldable area FDA, as shown in FIG. 8. However, embodiments of the present disclosure are not limited thereto. According to other embodiments of the present disclosure, the cross-section of each of the first conductive patterns 322 has a shape in which the rear surface is depressed inwards in the foldable area FDA, away from the base layer 321, or a shape in which both the front and the rear surfaces are depressed inwards in the foldable area FDA, i.e., the front surface is depressed toward the base layer 321 and the rear surface is depressed away from the base layer 321, or a shape in which one of the front surface and the rear surface is depressed inwards while the other one protrudes outwards in the foldable area FDA.

Figure 9:
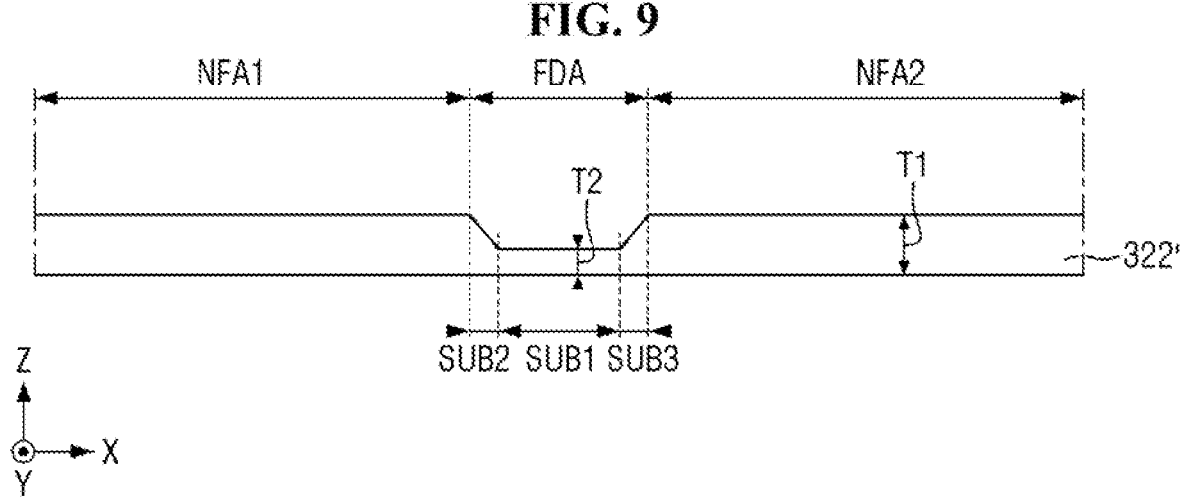
FIG. 9 is a cross-sectional view of another example of first conductive patterns.

In an embodiment shown in FIG. 8, each of the first conductive patterns 322 has a uniform thickness, i.e., the second thickness T2, in the foldable area FDA. According to some embodiments of the present disclosure, however, each of the first conductive patterns 322 may have a varying thickness in the foldable area FDA, as shown in FIG. 9. In such case, each of the first conductive patterns 322 includes, in the foldable area FDA, a first sub-region SUB1 that has a uniform thickness, i.e., the second thickness T2, and a second sub-region SUB2 and a third sub-region SUB3 that has a varying thickness that is greater than the second thickness T2 and less than the first thickness T1. The width of each of the second sub-region SUB2 and the third sub-region SUB3 in the first direction X is less than the width of the first sub-region SUB1 in the first direction X. For example, although not limited thereto, the width of each of the second sub-region SUB2 and the third sub-region SUB3 in the first direction X is equal to or less than one-third the width of the first sub-region SUB1, i.e, is not greater than one-third the width of the first sub-region SUB1.

In some embodiments, the thickness of each of the first conductive patterns 322 in the second sub-region SUB2 continuously increases from the second thickness T2 to the first thickness T in a direction opposite to the first direction X, and the thickness in the third sub-region SUB3 continuously increases from the second thickness T2 to the first thickness T in the first direction X. According to this structure, each of the first conductive patterns 322 can transfer an electric signal between the non-foldable areas NFA and the foldable area FDA.

In some embodiments, each of the first conductive patterns 322 is made up of a single layer. However, embodiments of the present disclosure are not limited thereto. In other embodiments, each of the first conductive patterns 322 may include multiple layers, or same regions may have a single layer while other regions may include multiple layers, depending on desired characteristics. For example, as will be described below with reference to FIG. 12, when the first conductive patterns 322 are formed by plating so that each of the first non-foldable area NFA1 and the second non-foldable area NFA2 is thicker than the foldable area FDA, the first conductive patterns has a single-layer structure in the foldable area FDA and a multi-layer structure in the first non-foldable area NFA1 and the second non-foldable area NFA2.

In addition, in some embodiments, when each of the first conductive patterns 322 includes multiple layers, each of the first conductive patterns 322 includes layers that perform functions other than electric signal transmission, such as a barrier layer or capping layer that protect lines, or an adhesive layer that bonds layers. In this embodiment, the first conductive patterns 322 may include the same material or different materials.

As such, in some embodiments, when each of the first conductive patterns 322 includes multiple layers, or at least some include regions with multiple layers, the thickness of a layer that transmits an electrical signal of each of the first conductive patterns 322 is greater than in the non-foldable areas NFA1 and NFA2 than in the foldable area FDA, while the thickness of a layer that performs a function other than transmitting an electrical signal is uniform across the foldable area FDA and the non-foldable areas NFA1 and NFA2. However, embodiments of the present disclosure are not limited thereto. The overall thickness of each of the first conductive patterns 322 is less in the foldable area FDA than in the first non-foldable area NFA1 and the second non-foldable area NFA2 as described above.

In some embodiments, each of the second conductive patterns 323 has a third thickness T3. According to an embodiment of the present disclosure, the length of the closed loop of each of the second conductive patterns 323 is greater than the length of the closed loop of each of the first conductive patterns 322. The electrical resistance is proportional to the thickness of a line and is inversely proportional to the length of the line, as mentioned earlier. Accordingly, for each of the second conductive patterns 323 to have signal transmission characteristics, the third thickness T3 is greater than the first thickness T1. As a non-limiting example, the third thickness T3 ranges from 8.0 to 13.0 µm or from 9.0 to 11.0 µm.

In some embodiments, each of the second conductive patterns 323 is disposed in the first non-foldable area NFA1 and the second non-foldable area NFA2 but is not disposed in the foldable area FDA. According to this structure, the display device 1 can be smoothly folded and has reduced folding stress applied to the first conductive patterns 322 in the foldable area FDA.

In some embodiments, the first cover layer 326 is disposed over the first conductive patterns 322. The first cover layer 326 prevents oxygen or moisture from permeating into the first conductive patterns 322. The first cover layer 326 includes a flexible insulating material. For example, the first cover layer 326 includes polyimide. The first cover layer 326 is attached over the base layer 321 and the first conductive patterns 322 by the first adhesive layer 324, which includes a thermosetting resin. The thermosetting resin includes, but is not limited to, an epoxy resin.

In some embodiments, the second cover layer 327 is disposed on the second conductive patterns 323. The second cover layer 327 prevents oxygen or moisture from permeating into the second conductive patterns 323. The second cover layer 327 includes a flexible insulating material. For example, the second cover layer 327 includes polyimide. The second cover layer 327 is attached over the base layer 321 and the second conductive patterns 323 by the second adhesive layer 325, which includes a thermosetting resin. The thermosetting resin includes, but is not limited to, an epoxy resin.

As described above, in some embodiments, since the second conductive patterns 323 are disposed in the first non-foldable area NFA1 and the second non-foldable area NFA2 but not the foldable area FDA, the second adhesive layer 325 and the second cover layer 327 disposed on the rear surface of the second conductive patterns 323 are also disposed in the first non-foldable area NFA1 and the second non-foldable area NFA2 but are not disposed in the foldable area FDA. According to this structure, the display device 1 can be smoothly folded and have reduced folding stress applied to the first conductive patterns 322 in the foldable area FDA.

As such, in some embodiments, each of the first conductive patterns 322 extends across the foldable area FDA and connects the first conductive patterns 322 in the first non-foldable area NFA1 and the second non-foldable area NFA2 with a thickness to give flexibility, thereby preventing cracks due to folding stress. In addition, for the structure of the first conductive patterns 322 can continuously sense the movement of an electronic pen in contact across the non-foldable areas NFA and the foldable area FDA, or software compensation allows a user to recognize that an electronic pen is sensed in the foldable area FDA.

Referring back to FIG. 3, in some embodiments, a shielding member 330 is disposed on the rear surface of the digitizer layer 320. The shielding member 330 includes a magnetic metal powders (MMP), so that an external magnetic field or an external electromagnetic signal that has passed through the digitizer layer 320 can flow into the shielding member 330. Therefore, the shielding member 330 can reduce emissions from a magnetic field or an electromagnetic signal to the rear surface of the display device 1.

In some embodiments, the shielding member 330 is not disposed in the foldable area FDA so that the display device 1 can be smoothly folded with reduced folding stress applied to the first conductive patterns 322 in the foldable area FDA. In such case, the shielding member 330 includes a first shielding member 331 and a second shielding member 332 disposed in the first non-foldable area NFA1 and second non-foldable area NFA2, respectively. The distance between the first shielding member 331 and the second shielding member 322 in the first direction X is less than the width of the foldable area FDA. According to this structure, when the display device 1 is smoothly folded in the foldable area FDA, a reduced folding stress is applied to the first conductive patterns 322 in the foldable area FDA while a magnetic field or an electric signal is emitted to the rear surface of the display device 1.

Hereinafter, an exemplary method of fabricating a digitizer layer according to an embodiment of the present disclosure will be described with reference to FIGS. 10 to 12.

Figure 10:
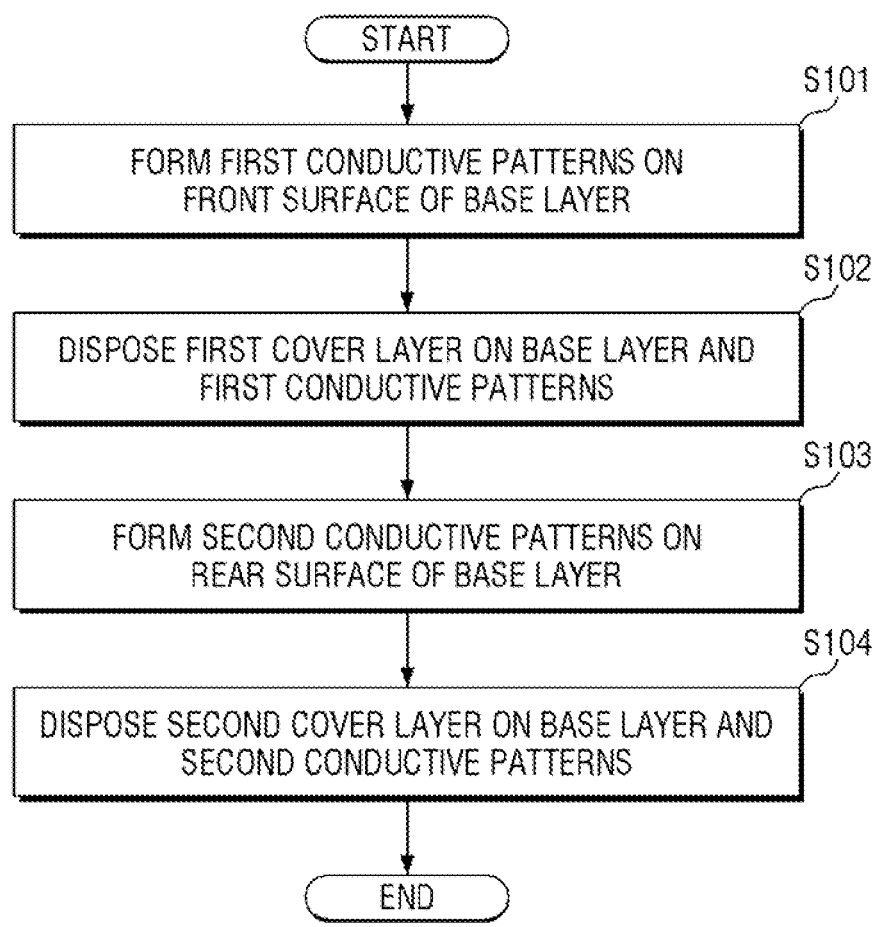
FIG. 10 is a flowchart of a method of fabricating a digitizer layer of FIG. 8.

FIG. 10 is a flowchart of a method of fabricating a digitizer layer of FIG. 8. FIG. 11 is a cross-sectional view that illustrates a method of forming first conductive patterns. FIG. 12 is another cross-sectional view that illustrates a method of forming first conductive patterns.

Referring to FIG. 10, in some embodiments, first conductive patterns 322 are formed on the entire surface of the base layer 321 (step S101).

According to an embodiment of the present disclosure, the first conductive patterns 322 are formed on the entire surface of the base layer 321. When each of the first conductive patterns 322 includes copper, a copper film or foil is stacked or deposited on the base layer 321 and then a closed loop structure, such as a rectangle, that extends in a direction perpendicular to the folding lines FL1 and FL2 is formed using a photoresist PR process.

In some embodiments, if the copper film is formed to have a first thickness T1, each of the patterns of the closed loop structure in the foldable area FDA is selectively etched down by a fourth thickness T4 that is equal to the difference between the first thickness T1 and the second thickness T2, as shown in FIG. 11. Accordingly, the first conductive patterns 322 are formed and have the second thickness T2 in the foldable area FDA and the first thickness T1 in each of the first non-foldable area NFA1 and the second non-foldable area NFA2. The etching may be carried out by either dry etching, which etches through a physical/chemical reaction that uses a reactive gas or ions, etc., or wet etching, which etches through a chemical reaction that uses an etching solution.

Figure 12:
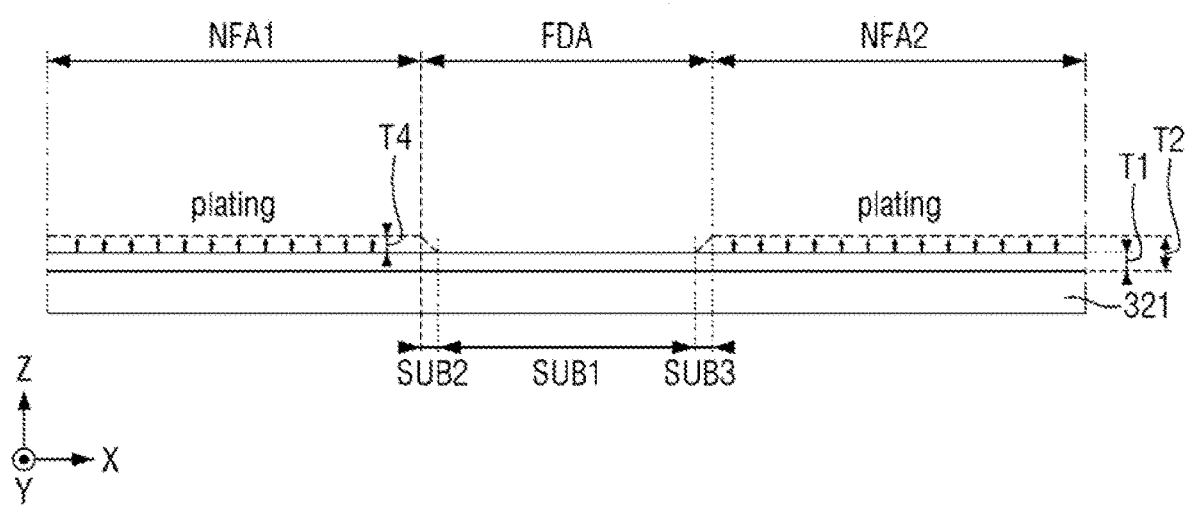
FIG. 12 is another cross-sectional view that illustrates a method of forming first conductive patterns.

For another example, in some embodiments, if the copper film initially has the second thickness T2, copper with the thickness of T4 is plated on the patterns of the closed loop structure disposed in each of the first non-foldable area NFA1 and the second non-foldable area NFA2, as shown in FIG. 12. Accordingly, the first conductive patterns 322 are formed, which have the second thickness T2 in the foldable area FDA and the first thickness T1 in each of the first non-foldable area NFA1 and the second non-foldable area NFA2.

Subsequently, the first cover layer 326 is disposed on the base layer 321 and the first conductive patterns 322 (step S102).

In some embodiments, the first cover layer 326, which includes polyimide, is attached over the base layer 321 and the first conductive patterns 322 by the first adhesive layer 324, which includes a thermosetting epoxy resin. The thermosetting epoxy resin has a thickness that is sufficient to cover the level differences that are due to the thickness differences between the first conductive patterns 322 in the foldable area FDA and the first and second non-foldable areas NFA1 and NFA2. Accordingly, the first adhesive layer 324 has a flat front surface, so prevent the level differences of the first conductive patterns 322 from being reflected in other layers, films, etc. disposed on the front surface of the digitizer layer 320.

Subsequently, second conductive patterns 323 are formed on the rear surface of the base layer 321 (step S103).

In some embodiments, each of the second conductive patterns 323 is formed on the rear surface of the base layer 321. When each of the second conductive patterns 323 includes copper, a copper foil having the third thickness T3 is laminated or deposited on the base layer 321, and then patterns of a closed loop structure, such as a rectangle, that extend in a direction parallel to the folding lines are formed in the first non-foldable area NFA1 and the second non-foldable area NFA2 using a photoresist (PR) process.

Subsequently, the second cover layer 327 is disposed on the base layer 321 and the second conductive patterns 323 (step S104).

In some embodiments, the second cover layer 327, which includes polyimide, is attached over the base layer 321 and the second conductive patterns 323 by the second adhesive layer 325, which includes a thermosetting epoxy resin. The second adhesive layer 325 and the second cover layer 327 are disposed in the first non-foldable area NFA1 and the second non-foldable area NFA2, but not in the foldable area FDA, so that the display device 1 can be smoothly folded and to reduce folding stress applied to the first conductive patterns 322 disposed in the foldable area FDA.

As a result, in some embodiments, the digitizer layer 320 as shown in FIG. 8 is completed. In the completed digitizer layer 320, each of the first conductive patterns 322 is thinner in the foldable area FDA than in the first non-foldable area NFA1 and the second non-foldable area NFA2, so that it has sufficient flexibility to prevent cracks from occurring in the first conductive patterns 322 when the display device is folded, and to have signal transmission characteristics by reducing electrical resistance in the first non-foldable area NFA1 and the second non-foldable area NFA2.

Figure 13:
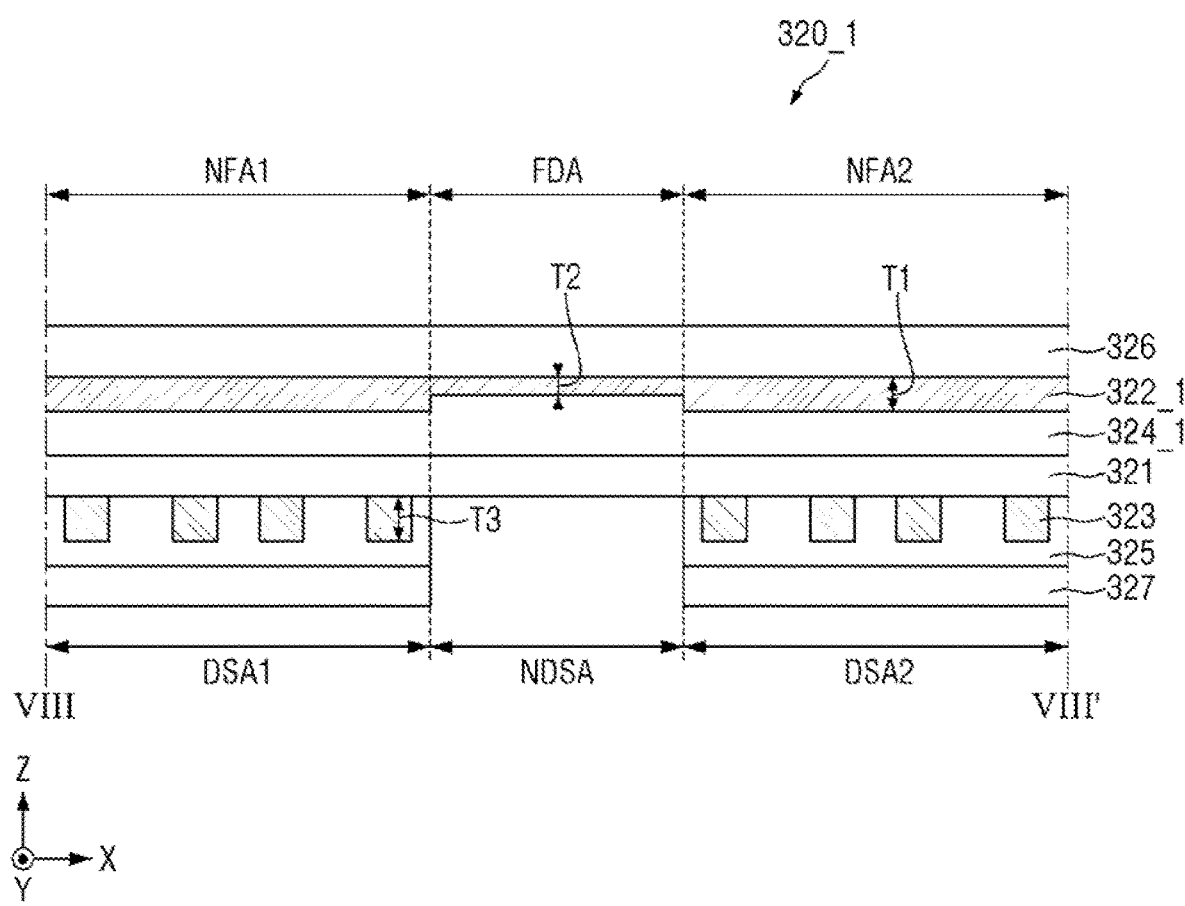
FIG. 13 is a cross-sectional view of a digitizer layer according to an embodiment.

FIG. 13 is a cross-sectional view of a digitizer layer according to an embodiment.

A digitizer layer 320_1 of FIG. 13 differs from that of an embodiment of FIG. 8 in that a cross-sectional shape of each of the first conductive patterns 322_1 has a shape in which the rear surface is depressed inwards in the foldable area FDA, away from the base layer 321. The following description will focus on the difference.

Referring to FIG. 13, in some embodiments, the thickness of the first conductive patterns 322_1 in each of the foldable area FDA and the non-foldable areas NFA1 and NFA2 is substantially equal to the thickness of the first conductive patterns 322 in each of the foldable area FDA and the non-foldable areas NFA1 and NFA2 of FIG. 8. However, a cross-sectional shape of each of the first conductive patterns 322_1 has a shape in which the rear surface is depressed inwards, away from the base layer 321, in the foldable area FDA.

According to an embodiment of the present disclosure, display device 1 includes a neutral plane in the circuit-driving layer DRL (see FIG. 4) or the emission material layer EML (see FIG. 4) of the display panel 10. The neutral plane is a conceptual plane in a bent structure. According to an embodiment, the neutral plane may be defined as a plane that has no stress even when the display device 1 is folded, and has no compression or tension so that the length is substantially constant before and after the display device is folded. Accordingly, an element, a layer, a film, etc. disposed on the neutral plane can be deformed more and endure a larger stress caused by being folded away from the neutral plane in the thickness direction.

Accordingly, as each of the first conductive patterns 322_1 shown in FIG. 13 has a shape in which the rear surface is depressed inwards in the foldable area FDA, away from the base layer 321, the distance from the neutral plane in the thickness direction is reduced as compared to the first conductive patterns 322_1 according to an embodiment of FIG. 8. Therefore, reducing the magnitude of the folding stress applied to each of the first conductive patterns 322_1 in the foldable area FDA can prevent cracks caused by the folding stress in each of the first conductive patterns 322_1.

Figure 14:
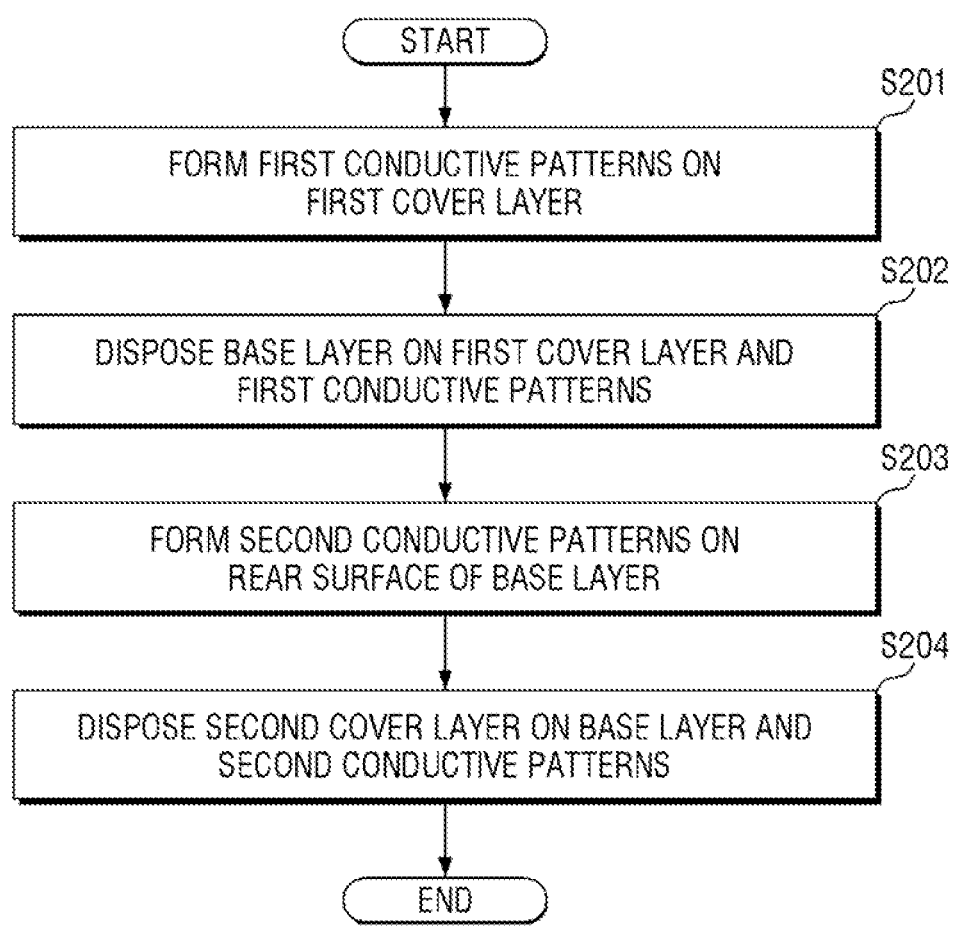
FIG. 14 is a flowchart of a method of fabricating a digitizer layer of FIG. 13.

FIG. 14 is a flowchart of a method of fabricating a digitizer layer of FIG. 13.

A method of FIG. 14 differs from a method of FIG. 10 in that a first cover layer 326 is used as a substrate for forming first conductive patterns 322_1. Description will focus on the difference.

In some embodiments, since each of the first conductive patterns 322_1 of FIG. 13 has a cross-sectional shape in which the rear surface is depressed inwards away from the base layer 321, the first conductive patterns 322_1 are formed on the first cover layer 326, using it as a substrate (step S201).

A method of forming the first conductive patterns 322_1 is substantially the same as a method of forming the first conductive patterns 322 of FIG. 10.

In addition, in some embodiments, since each of the first conductive patterns 322_1 is formed using the first cover layer 326 as the substrate, the front surface of the first cover layer 326 is flat. Therefore, level differences of the first conductive patterns 322_1 are prevented from being reflected to other layers or films disposed on the front surface of the digitizer layer 320_1.

Subsequently, a base layer 321 is disposed on the rear surface of the first cover layer 326 and the first conductive patterns 322_1 (step S202).

In some embodiments, the base layer 321 is attached to the rear surface of the first cover layer 326 and the first conductive patterns 322_1 by a first adhesive layer 324_1 that includes a thermosetting epoxy resin.

Subsequently, in some embodiments, second conductive patterns 323 are formed on the rear surface of the base layer 321 (step S203), and a second cover layer 327 is formed on the rear surface of the base layer 321 and the second conductive patterns 323 (step S204).

A method of forming or disposing each of the second conductive patterns 323, the second adhesive layer 325 and the second cover layer 327 on the rear surface of the base layer 321 of FIG. 13 is substantially the same as a method of forming or disposing each of the second conductive patterns 323, the second adhesive layer 325 and the second cover layer 327 on the rear surface of the base layer 321 of FIG. 10.

Figure 15:
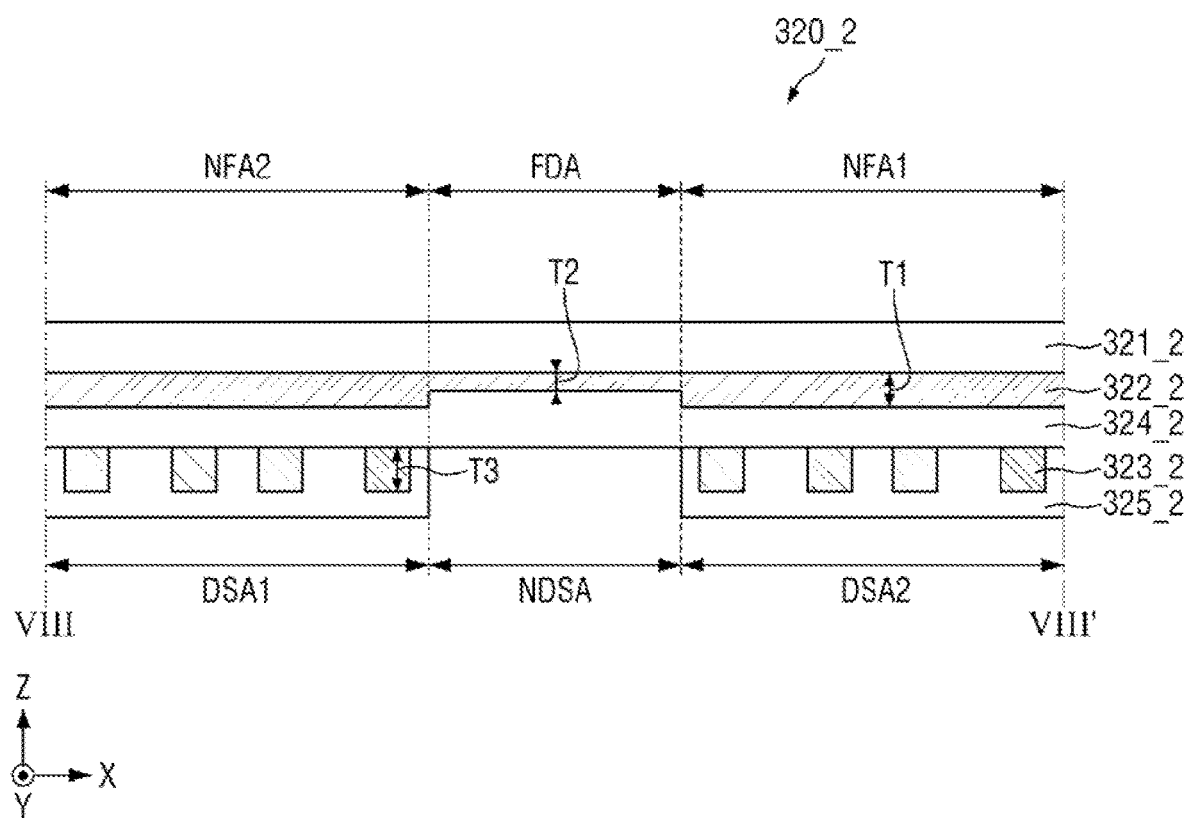
FIG. 15 is a cross-sectional view of a digitizer layer according to an embodiment.

FIG. 15 is a cross-sectional view of a digitizer layer according to an embodiment.

In some embodiments, a digitizer layer 320_2 of FIG. 15 differs from that of an embodiment of FIG. 8 in that each of a first adhesive layer 324_2 and a second adhesive layer 325_2 includes a photopolymer resin, and each of the first adhesive layer 324_2 and the second adhesive layer 325_2 serves as a substrate for forming conductive patterns or as a cover layer for electrical insulation. The following description will focus on the differences.

Referring to FIG. 15, in some embodiments, the digitizer layer 320_2 includes a base layer 321_2, first conductive patterns 322_2 disposed on the base layer 321_2, the first adhesive layer 324_2 disposed on the base layer 321_2 and the first conductive patterns 322_2, second conductive patterns 323_2 disposed on the first adhesive layer 324_2, and the second adhesive layer 325_2 disposed on the first adhesive layer 324_2 and the second conductive patterns 323_2.

In some embodiments, the base layer 321_2 serves as a substrate on which the first conductive patterns 322_2 are disposed. The base layer 321_2 includes an insulating material. For example, the base layer 321_2 includes, but is not limited to, polyimide.

In some embodiments, the first conductive patterns 322_2 are disposed on the base layer 321_2. The shape of the first conductive patterns 322_2 is substantially identical to the shape of the first conductive patterns 322_1 of FIG. 13. That is to say, the cross-sectional shape of each of the first conductive patterns 322_2 in which the rear surface is depressed inwards toward the base layer 321_2 in the foldable area FDA can prevent cracks due to folding stress.

In some embodiments, the first adhesive layer 324_2 is disposed on the first conductive patterns 322_2. The first adhesive layer 324_2 serves as a substrate on which the second conductive patterns 323_2 are disposed. The first adhesive layer 324_2 includes an insulating photopolymer resin. The photopolymer resin includes, for example, at least one of an acrylic resin or a silicone resin, or a photosensitive polyimide resin, as an ultraviolet curable resin that is cured by ultraviolet (UV). However, embodiments of the present disclosure are not limited thereto.

In some embodiments, the photopolymer resin has a higher modulus than the thermosetting resin. When the modulus is relatively large, the deformation is relatively small, even when the same force is applied. Accordingly, when the first adhesive layer 324_2 includes a photopolymer resin, the deformation of the first adhesive layer 324_2 is relatively small when the display device 1 is folded, and the first conductive patterns 322_2 remain aligned. Therefore, cracks, etc., can be prevented in each of the first conductive patterns 322_2.

In some embodiments, the second conductive patterns 323_2 are disposed on the first adhesive layer 324_2. The shape, thickness, extension direction and arrangement direction of the second conductive patterns 323_2 is substantially the same as the shape, thickness, extension direction and arrangement direction of the second conductive patterns 323 of FIG. 8.

In some embodiments, the second adhesive layer 325_2 is disposed on the first adhesive layer 324_2 and the second conductive patterns 323_2. The second adhesive layer 325_2 prevents oxygen or moisture from permeating into the second conductive patterns 323_2. Since the second adhesive layer 325_2 includes an insulating photopolymer resin, alignment of the second conductive patterns 323_2 can be maintained. The second adhesive layer 325_2 is disposed in the first non-foldable area NFA1 and the second non-foldable area NFA2, but not the foldable area FDA.

In some embodiments, each of the first adhesive layer 324_2 and the second adhesive layer 325_2 can serve as a substrate for forming the conductive patterns 322_2 and 323_2 or as a cover layer for electrical insulation, thereby reducing the overall thickness of the digitizer layer 320_2. Accordingly, the amount of stress caused by folding of the display device 1 can be reduced.

Figure 16:
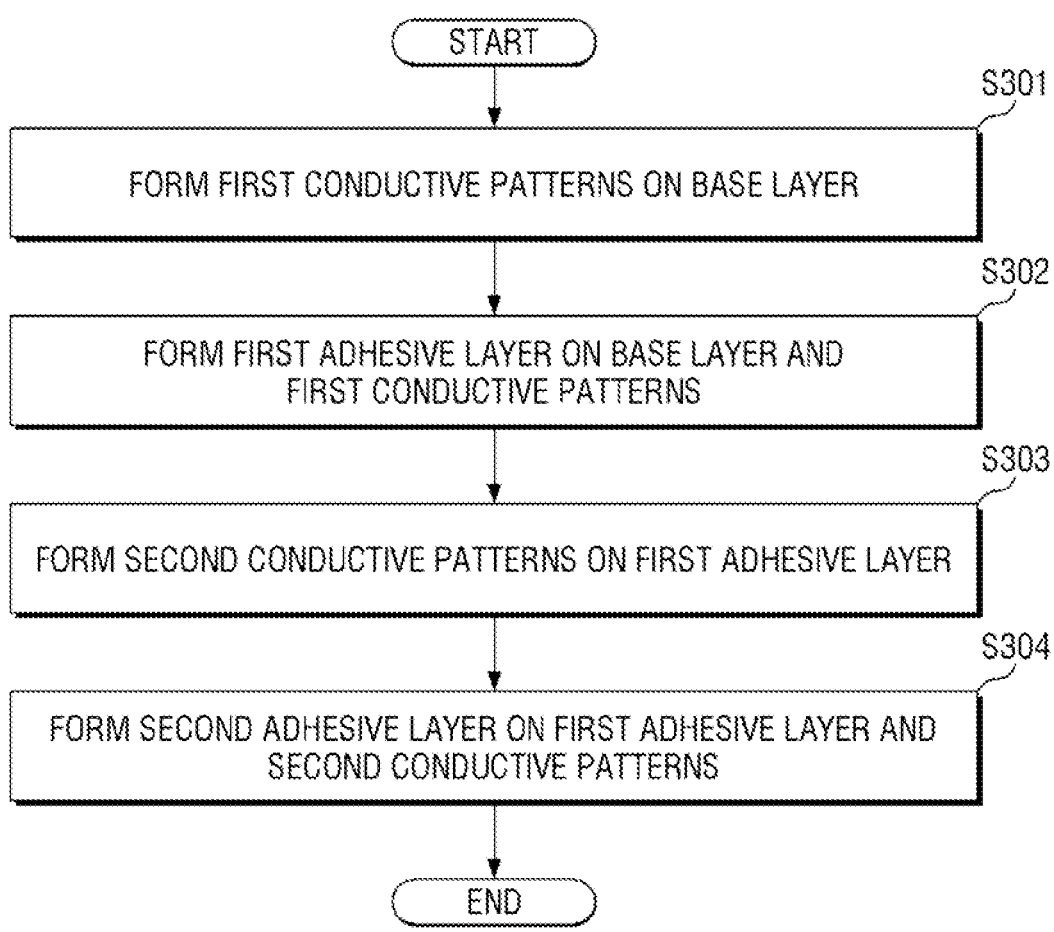
FIG. 16 is a flowchart of a method of fabricating a digitizer layer of FIG. 15.

FIG. 16 is a flowchart of a method of fabricating a digitizer layer of FIG. 15.

A method of FIG. 16 differs from a method of FIG. 10 in that a first adhesive layer 324_2 is used as a substrate for forming the second conductive patterns 323_2, and that UV light is irradiated to cure each of the first adhesive layer 324_2 and the second adhesive layer 325_2. The following description will focus on the differences.

Referring to FIG. 15, in some embodiments, first conductive patterns 322_2 are formed on the base layer 321_2 (step S301).

A method of forming the first conductive patterns 322_2 is substantially the same as a method of forming the first conductive patterns 322 of FIG. 10.

Subsequently, the first adhesive layer 324_2 is formed on the base layer 321_2 and the first conductive patterns 322_2 (step S302).

In some embodiments, the first adhesive layer 324_2 is applied in a liquid state on the base layer 321_2 and the first conductive patterns 322_2 and cured by UV irradiation. In such a case, the first adhesive layer 324_2 has a thickness sufficient to cover the level differences that are due to thickness differences between the first conductive patterns 322 in the foldable area FDA and the non-foldable areas NFA1 and NFA2. Accordingly, a surface of the first adhesive layer 324_2 opposite to a surface on which the base layer 321_2 or the first conductive patterns 322_2 are disposed is flat. Therefore, the first adhesive layer 324_2 serves as a substrate on which the second conductive patterns 323_2 are disposed.

Subsequently, in some embodiments, second conductive patterns 323_2 are formed on the first adhesive layer 324_2 (step S303), and a second adhesive layer 325_2 is formed on the first adhesive layer 324_2 and the second conductive patterns 323_2 (step S304).

A method of forming the second conductive patterns 323_2 on the first adhesive layer 324_2 is substantially the same as a method of forming the second conductive patterns 323 on the base layer 321 of FIG. 10. A method of forming the second adhesive layer 325_2 on the first adhesive layer 324_2 and the second conductive patterns 323_2 is substantially the same as an above-described method of forming the first adhesive layer 324_2 on the base layer 321_2 and the first conductive patterns 322.

In some embodiments, the second adhesive layer 325_2 is disposed in the first non-foldable area NFA1 and the second non-foldable area NFA2, but not in the foldable area FDA, so that the display device 1 can be smoothly folded and do that folding stress applied to the first conductive patterns 322_2 disposed in the foldable area FDA can be reduced.

Figure 17:
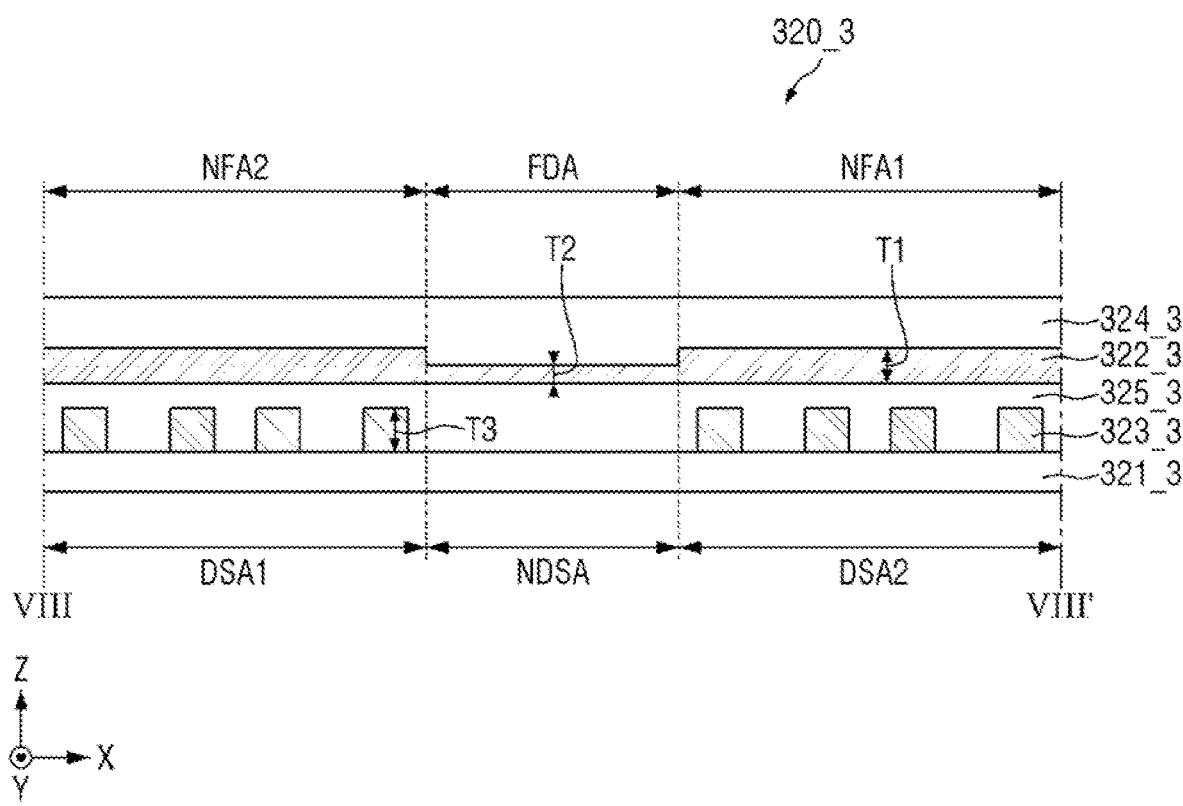
FIG. 17 is a cross-sectional view of a digitizer layer according to an embodiment.

FIG. 17 is a cross-sectional view of a digitizer layer according to an embodiment.

A digitizer layer 320_3 of FIG. 17 is substantially identical to that of an embodiment of FIG. 15 except that second conductive patterns 323_3 are disposed on a base layer 321_3, and that each of first conductive patterns 322_3 has a shape in which the front surface is depressed inwards toward the base layer 321_3 in the foldable area FDA; and, therefore, redundant descriptions will be omitted.

Figure 18:
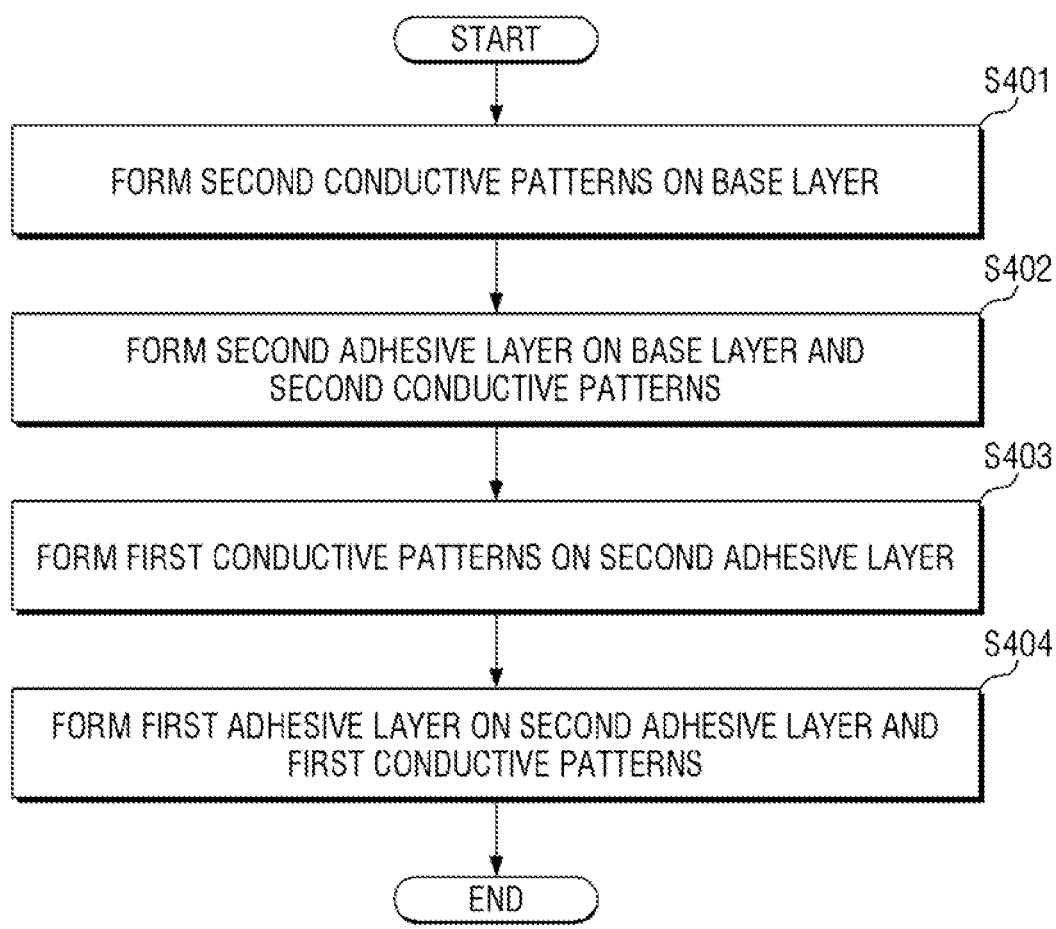
FIG. 18 is a flowchart of a method of fabricating the digitizer layer of FIG. 17.

FIG. 18 is a flowchart of a method of fabricating a digitizer layer of FIG. 17. A method of FIG. 18 is substantially identical to a method of FIG. 16 except that second conductive patterns 323_3 are formed on a base layer 321_3, and then a second adhesive layer 325_3, first conductive patterns 322_3 and a first adhesive layer 324_4 are formed in this order; and, therefore, redundant descriptions will be omitted.

Hereinafter, embodiments will be described in more detail with reference to Examples and Experimental Examples.

Example 1

A digitizer layer 320 having the cross section shown in FIG. 8 was fabricated, in which the first thickness T1 of each of the first conductive patterns 322 disposed in the non-foldable areas NFA was 6.0 μm, the second thickness T2 of each of the first conductive patterns 322 disposed in the foldable area FDA was 1.5 μm, and the third thickness T3 of each of the second conductive patterns 323 disposed in the non-foldable areas NFA was 11 μm. The digitizer layer was attached to the rear surface of the display panel 10, to fabricate a foldable display device which can be folded such that a part of the display surface faces the other part thereof.

Example 2

A foldable display device was fabricated in the same manner as in Example 1, except that the digitizer layer had a cross section shown in FIG. 13.

Example 3

A foldable display device was fabricated in the same manner as in Example 1, except that the digitizer layer had a cross section shown in FIG. 15.

Example 4

A foldable display device was fabricated in the same manner as in Example 1, except that the digitizer layer had a cross section shown in FIG. 17.

Example 5

A foldable display device was fabricated in the same manner as in Example 2, except that the second thickness T2 of the first conductive patterns in the foldable area FDA was 2.5 μm.

Example 6

A foldable display device was fabricated in the same manner as in Example 2, except that the first thickness T1 of the first conductive patterns in the non-foldable areas NFA was 4.0 μm.

Example 7

A foldable display device was fabricated in the same manner as in Example 2, except that the third thickness T3 of the second conductive patterns disposed in the non-foldable areas NFA was 6 µm.

Experimental Example

Folding times and sensitivities for recognizing an electronic pen were measured for the foldable display devices according to Examples 1 to 7 above.

In the folding test, when the display device 1 was folded and unfolded once, it was counted as one time. The number of folding times until the digitizer layer of the display device 1 fails to normally sense the electronic pen was calculated.

The test of electronic pen recognition sensitivity was conducted by repeatedly bringing the electronic pen into proximity or contact several times. Whether or not the electronic pen was normally sensed was expressed as a percentage.

The results of Experimental Example were shown in Table 1.

TABLE 1

|  | First Thickness (T1) | Second Thickness (T2) | Third Thickness (T3) | Number of Folding Times | Electronic Pen Recognition Sensitivity |
| --- | --- | --- | --- | --- | --- |
| Example 1 | 6.0 µm | 1.5 µm | 11 µm | 150,000 | 100% |
| Example 2 | 6.0 µm | 1.5 µm | 11 µm | 200,000 | 100% |
| Example 3 | 6.0 µm | 1.5 µm | 11 µm | 200,000 | 100% |
| Example 4 | 6.0 µm | 1.5 µm | 11 µm | 150,000 | 100% |
| Example 5 | 6.0 µm | 2.5 µm | 11 µm | 100,000 | 100% |
| Example 6 | 4.0 µm | 1.5 µm | 11 µm | 200,000 | 70% |
| Example 7 | 6.0 µm | 1.5 µm | 6 µm | 200,000 | 60% |

Results of the tests are displayed with reference to Table 1. In Examples 1 and 4, in which the cross-sectional shape of each of the first conductive patterns 322 had the shape in which the front surface was depressed inwards toward the base layer 321 in the foldable area FDA, the number of folding times was 150,000 or more. In Examples 2 and 3, in which the cross-sectional shape of each of the first conductive patterns 322_1 had the shape in which the rear surface was depressed inwards away from the base layer 321 in the foldable area FDA, the number of folding times was 200,000 or more.

When foldable display devices according to Examples are folded, the neutral plane is positioned in the display panel 10. Accordingly, each of the first conductive patterns 322 has the cross-sectional shape in which the rear surface is depressed inwards in the foldable area FDA, and thus Examples 2 and 3, in which the distance from the neutral plane in the thickness direction is relatively small, exhibit a result in preventing more cracks, etc., due to the folding stress.

Example 2 and Example 5 differ in the second thickness T2 of the first conductive patterns 322 disposed in the foldable area FDA. Example 2 and Example 5 both have the same pen recognition sensitivity of 100%. However, in Example 2, in which the second thickness T2 is 1.5 µm, the number of folding times is 200,000 or more, while in Example 5, in which the second thickness T2 is 2.5 µm, the number of folding times is 100,000. It can be seen that thinner the first conductive patterns 322 in the foldable area FDA are more flexible, and thus the number of folding times of Example 2 is greater than that of Example 5.

Example 2 and Example 6 differ in the first thickness T1 of the first conductive patterns 322 disposed in the non-foldable area NFA. Example 2 and Example 6 have the same second thickness T2 of 1.5 µm, and accordingly the number of folding times are both 200,000. However, in Example 2, in which the first thickness T1 is 6.0 µm, the electronic pen recognition sensitivity is 100%, while in Example 6, in which the first thickness T1 is 4.0 µm, which is thinner than Example 2, the electronic pen recognition sensitivity is 70%. Since the electrical resistance increases as the first thickness T1 is reduced, Example 6, which has the smaller first thickness T1, had a lower electronic pen recognition sensitivity than Example 2.

Example 2 and Example 7 differ\ in the third thickness T3 of the second conductive patterns 323. In Example 2, in which the third thickness T3 is 11 µm, the electronic pen recognition sensitivity is 100%, while in Example 7, in which the third thickness T3 is 6 µm, which is thinner than Example 2, the electronic pen recognition sensitivity is 60%. Since the electrical resistance increases as the third thickness T3 is reduced, Example 6, which as the smaller third thickness T3, had a lower electronic pen recognition sensitivity than Example 2.

In addition, in the above Examples, the length of the closed loop of each of the second conductive patterns 323 is greater than the length of the closed loop of each of the first conductive patterns 322. Accordingly, when the third thickness T3 of the second conductive patterns 323 is greater than the first thickness T1 of the first conductive patterns 322, the electronic pen recognition sensitivity can be increased.

Although embodiments of the disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. An electronic product, comprising:
a sensing area that senses a touch;
a non-sensing area adjacent to the sensing area and that does not sense a touch;
a display panel that displays an image on a front surface; and
a stack structure on a rear suffice of the display panel and that includes a plurality of conductive patterns that sense a touch,
wherein the plurality of conductive patterns includes first conductive patterns that extend in a first direction across the sensing area and the non-sensing area, and
wherein each of the first conductive patterns has a first thickness in the sensing area and a second thickness in the non-sensing area that is less than the first thickness.

2. The electronic product of claim 1, wherein the first thickness is at least twice the second thickness.

3. The electronic product of claim 1, wherein the stack structure further comprises a digitizer layer that senses a touch from an electronic pen, and
wherein the digitizer layer comprises:
second conductive patterns that extend in a second direction that intersects the first direction, wherein the second conductive patterns are disposed in the sensing area; and
an insulating layer interposed between the first conductive patterns and the second conductive patterns and that includes an insulating material.

4. The electronic product of claim 3, wherein each of the first conductive patterns comprises:
a first sub-region in the on-sensing area that has the uniform second thickness; and a second sub-region in the non-sensing area and that has a thickness that continuously increases from the second thickness to the first thickness.

5. The electronic product of claim 3, wherein the second conductive patterns have a third thickness greater than the first thickness.

6. An electronic product, comprising:
a display panel;
a first stress area and a second stress area; and
a stack structure disposed on the display panel and that includes a plurality of conductive patterns,
wherein the plurality of conductive patterns includes a first conductive pattern that extends across the first stress area and the second stress area,
wherein the first conductive pattern has a first thickness in the first stress area and a second thickness in the second stress area that is less than the first thickness, and
wherein the first stress area is subjected to less stress than the second stress area.

7. The electronic product of claim 6, wherein the second stress area is a foldable area that is bendable or foldable, and the first stress area is a non foldable area that is neither bent nor folded.

8. The electronic product of claim 7, wherein the first conductive pattern has a cross-sectional shape in which a front surface thereof is depressed inwards in the foldable area.

9. The electronic product of claim 7, wherein the display panel displays images on a front side,
wherein the display panel and the stack structure are configured to be folded toward the front side,
wherein the display panel includes a neutral plane that does not increase or decrease in length when the foldable area is folded, and
wherein the first conductive pattern has a cross-sectional shape in which a rear surface thereof is depressed inwards in the foldable area.

10. The electronic product of claim 7, wherein the first thickness is at least twice the second thickness.

11. The electronic product of claim 7, wherein the first conductive pattern comprises:
a first sub-region in the foldable area that has the second thickness; and
a second sub-region that has a thickness in the foldable area that continuously increases from the second thickness to the first thickness.

12. The electronic product of claim 11, wherein a width of the second sub-region is not greater than one-third a width of the first sub-region.

13. The electronic product of claim 7, wherein the stack structure comprises a digitizer layer on a rear surface of the display panel, and
wherein the first conductive pattern senses an external magnetic field or external electromagnetic signal.

14. The electronic product of claim 13, wherein the digitizer layer comprises:
a base layer that includes an insulating material and that is disposed on a rear surface of the first conductive pattern; and
a second conductive pattern disposed on a rear surface of the base layer and that extends and intersects the first conductive pattern when viewed from above.

15. The electronic product of claim 14, wherein the second conductive patterns are disposed in the non-foldable area.

16. The electronic product of claim 14, wherein each of the first conductive pattern and the second conductive pattern has a closed loop shape when viewed from above,
wherein a length of the closed loop of the second conductive pattern is greater than the length of the closed loop of the first conductive pattern, and
wherein the second conductive pattern has a third thickness that is greater than the first thickness.

17. The electronic product of claim 16, wherein the first thickness ranges from 4.0 to 8 µm, the second thickness is equal to or greater than 1.0 µm and less than 2.5 µm, and the third thickness ranges from 8.0 to 13.0 µm.

18. The electronic product of claim 13, wherein the digitizer layer comprises:
a base layer that includes an insulating material;
a second conductive pattern that extends and intersects the first conductive pattern when viewed from above;
a first adhesive layer that includes an insulating photopolymer resin and that is disposed on the first conductive pattern; and
a second adhesive layer that includes an insulating photopolymer resin and that is disposed on the second conductive pattern,
wherein the base layer is disposed on either a front surface of the first conductive pattern or a rear surface of the second conductive pattern.

19. The electronic product of claim 18,
wherein the first conductive pattern has a cross-sectional shape with a rear surface thereof that is depressed inwards towards the base layer,
wherein the base layer is disposed on the front surface of the first conductive pattern,
wherein the first adhesive layer is disposed between the first conductive pattern and the second conductive pattern, and
wherein the second conductive pattern and the second adhesive layer are disposed in the non-foldable area.

20. The electronic product of claim 18,
wherein the base layer is disposed on a rear surface of the second conductive patterns, and
wherein the second adhesive layer is disposed between the second conductive patterns and the first conductive patterns.

21. An electronic product, comprising:
a display panel that includes front surface that displays an image and a rear surface opposite to the front surface, and a foldable area and a non-foldable area; and
a digitizer layer disposed on the rear surface of the display panel, wherein the digitizer layer comprises:
a base layer that includes an insulating material, and
a first conductive pattern and a second conductive pattern that are disposed on the base layer,
wherein the first conductive pattern extends across the foldable area and the non-foldable area in a first direction,
wherein the second conductive pattern is disposed in the non-foldable area and extends across the first conductive pattern in a second direction that crosses the first direction, when viewed from above,
wherein the first conductive pattern has a first thickness in the foldable area and a second thickness in the non-foldable area that is less than the first thickness,
wherein the second conductive pattern has a third thickness that is greater than the first thickness, and wherein the first conductive pattern senses an external magnetic field or external electromagnetic signal.

* * * * *